(12) United States Patent
Beck et al.

(10) Patent No.: US 11,287,017 B2
(45) Date of Patent: Mar. 29, 2022

(54) TRANSMISSION FOR A MOTOR VEHICLE, MOTOR VEHICLE POWERTRAIN, AND METHOD FOR OPERATING A TRANSMISSION

(71) Applicant: ZF Friedrichshafen AG, Friedrichshafen (DE)

(72) Inventors: Stefan Beck, Eriskirch (DE); Johannes Kaltenbach, Friedrichshafen (DE); Matthias Horn, Tettnang (DE); Uwe Griesmeier, Markdorf (DE); Fabian Kutter, Kressbronn (DE); Thomas Martin, Weissensberg (DE); Michael Wechs, Weissensberg (DE); Jens Moraw, Markdorf (DE); Gerhard Niederbrucker, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/274,039

(22) PCT Filed: Aug. 5, 2019

(86) PCT No.: PCT/EP2019/070998
§ 371 (c)(1),
(2) Date: Mar. 5, 2021

(87) PCT Pub. No.: WO2020/048707
PCT Pub. Date: Mar. 12, 2020

(65) Prior Publication Data
US 2021/0356021 A1 Nov. 18, 2021

(30) Foreign Application Priority Data
Sep. 7, 2018 (DE) .................. 10 2018 215 233.0

(51) Int. Cl.
| | | |
|---|---|---|
| *F16H 3/72* | (2006.01) | |
| *B60K 6/547* | (2007.10) | |
| *B60K 6/365* | (2007.10) | |

(52) U.S. Cl.
CPC ............. *F16H 3/727* (2013.01); *B60K 6/365* (2013.01); *B60K 6/547* (2013.01);
(Continued)

(58) Field of Classification Search
CPC ................................. B60K 6/547; B60K 6/365
See application file for complete search history.

(56) References Cited

U.S. PATENT DOCUMENTS

| | | | |
|---|---|---|---|
| 2006/0240929 A1 | 10/2006 | Raghavan et al. | |
| 2020/0384847 A1* | 12/2020 | Beck | ................. B60K 6/365 |
| 2021/0309096 A1* | 10/2021 | Beck | ................. F16H 3/66 |

FOREIGN PATENT DOCUMENTS

| | | |
|---|---|---|
| DE | 102014204009 A1 | 9/2015 |
| DE | 102014218610 A1 | 3/2016 |

(Continued)

OTHER PUBLICATIONS

International Search Report (English Translation) PCT/EP2019/070998, dated Oct. 10, 2019, (2 pages).

*Primary Examiner* — Derek D Knight
(74) *Attorney, Agent, or Firm* — Dority & Manning, P.A.

(57) ABSTRACT

A transmission (G) for a motor vehicle includes an electric machine (EM1), a first input shaft (GW1), a second input shaft (GW2), an output shaft (GWA), two planetary gear sets (P1, P2, P3), and at least five shift elements (A, B, C, D, E). Different gears are implementable by selectively actuating the at least five shift elements (A, B, C, D, E) and, in addition, in interaction with the electric machine (EM1), different operating modes are implementable. A drive train
(Continued)

for a motor vehicle with the transmission (G) and a method for the transmission (G) are also provided.

23 Claims, 30 Drawing Sheets

(52) U.S. Cl.
CPC ............... *F16H 2200/2007* (2013.01); *F16H 2200/2056* (2013.01); *F16H 2312/20* (2013.01)

(56) References Cited

FOREIGN PATENT DOCUMENTS

| | | |
|---|---|---|
| JP | 2009001234 A | 1/2009 |
| WO | WO 2015/131897 | 9/2015 |

* cited by examiner

Hybrid Gears

| Gear | Engaged Shifting Elements | | | | |
|---|---|---|---|---|---|
| | A | B | C | D | E |
| 1 | X | | | X | |
| 2 | X | | | | X |
| 3.1 | X | | X | | |
| 3.2 | | X | X | | |
| 3.3 | | | X | X | |
| 3.4 | | | X | | X |
| 3.8 | | | | X | X |
| 4 | | X | | | X |

Electric Gears and EDA Modes

| Gear | Engaged Shifting Elements | | | | |
|---|---|---|---|---|---|
| | A | B | C | D | E |
| E2 | X | | | | |
| E4 | | X | | | |
| EDA-R | | | | X | |

Purely Internal-Combustion Engine Gears (with decoupled electric machine)

| Gear | Engaged Shifting Elements | | | | |
|---|---|---|---|---|---|
| | A | B | C | D | E |
| V3 | | | X | | |

Fig. 4

Hybrid Gears

| Gear | Engaged Shifting Elements | | | | | |
|---|---|---|---|---|---|---|
| | A | B | C | D | E | F |
| 1 | X | | | X | | |
| 2 | X | | | | X | |
| 3.1 | X | | X | | | |
| 3.2 | | X | X | | | |
| 3.3 | | | X | X | | |
| 3.4 | | | X | | X | |
| 3.5 | | | X | | | X |
| 3.6 | | | | | X | X |
| 3.7 | | | | X | | X |
| 3.8 | | | | X | X | |
| 4 | | X | | | X | |
| Z1 | | X | | | | X |

Electric Gears and EDA Modes

| Gear | Engaged Shifting Elements | | | | | |
|---|---|---|---|---|---|---|
| | A | B | C | D | E | F |
| E2 | X | | | | | |
| E4 | | X | | | | |
| EDA-V | | | | | | X |
| EDA-R | | | | X | | |

Purely Internal-Combustion Engine Gears (with decoupled electric machine)

| Gear | Engaged Shifting Elements | | | | | |
|---|---|---|---|---|---|---|
| | A | B | C | D | E | F |
| V3 | | | X | | | |

Fig. 7

Shift Conditions
Purely Electric Driving With Only One EM (K0 disengaged)
(EM1 or EM2)

| Gear | Engaged Shifting Elements | | | | | |
|---|---|---|---|---|---|---|
| | A | B | C | D | E | F |
| E2 (EM1) | X | | | | | |
| E3 (EM2) | | | X | | | |
| E4 (EM1) | | X | | | | |

Purely Electric Driving With Two Electric Machines
(K0 disengaged, gear from view of EM2)
(EM1 and EM2)

| Gear | Engaged Shifting Elements | | | | | |
|---|---|---|---|---|---|---|
| | A | B | C | D | E | F |
| E1 | X | | | X | | |
| E2 | X | | | | X | |
| E3.1 | X | | X | | | |
| E3.2 | | X | X | | | |
| E3.3 | | | X | X | | |
| E3.4 | | | X | | X | |
| E3.5 | | | X | | | X |
| E3.6 | | | | | X | X |
| E3.7 | | | | X | | X |
| E3.8 | | | | X | X | |
| E4 | | X | | | X | |
| EZ1 | | X | | | | X |

Fig. 17

TRANSMISSION FOR A MOTOR VEHICLE, MOTOR VEHICLE POWERTRAIN, AND METHOD FOR OPERATING A TRANSMISSION

CROSS-REFERENCE TO RELATED APPLICATION

The present application is related and has right of priority to German Patent Application No. 102018215233.0 filed in the German Patent Office on Sep. 7, 2018 and is a nationalization of PCT/EP2019/070998 filed in the European Patent Office on Aug. 5, 2019, both of which are incorporated by reference in their entirety for all purposes.

FIELD OF THE INVENTION

The invention relates generally to a transmission for a motor vehicle, including an electric machine, a first input shaft, a second input shaft, an output shaft, and a first planetary gear set, a second planetary gear set, and a third planetary gear set. The planetary gear sets each include multiple elements, wherein a first, a second, a third, a fourth, and a fifth shift element are provided. A rotor of the electric machine is connected to the second input shaft. Moreover, the invention relates generally to a motor vehicle drive train, in which the transmission is utilized, and to a method for operating the transmission.

BACKGROUND

In hybrid vehicles, transmissions are known which also include, in addition to a gear set, one or multiple electric machine(s). In this case, the transmission is usually configured to be multi-stage, i.e., multiple different ratios are selectable, as gears, between an input shaft and an output shaft by actuating appropriate shift elements, wherein this is preferably automatically carried out. Depending on the arrangement of the shift elements, the shift elements are clutches or brakes. The transmission is utilized in this case for suitably implementing an available tractive force of a prime mover of the motor vehicle with respect to various criteria. In this case, the gears of the transmission are mostly also utilized in interaction with the at least one electric machine for implementing purely electric driving. Frequently, the at least one electric machine can also be integrated in the transmission in order to implement various operating modes in different ways.

DE 10 2014 218 610 A1 describes a transmission for a hybrid vehicle, which includes, in addition to a first input shaft and an output shaft, three planetary gear sets and an electric machine. Moreover, in one variant, six shift elements are provided, via which different power paths are achieved from the first input shaft to the output shaft while implementing different gears and, in addition, different integrations of the electric machine can be configured. Here, purely electric driving can also be implemented simply by transmitting power via the electric machine.

SUMMARY OF THE INVENTION

Example aspects of the present invention provide a transmission for a motor vehicle, with which, with a compact design, different operating modes can be implemented in a suitable way.

According to example aspects of the invention, a transmission includes an electric machine, a first input shaft, a second input shaft, an output shaft, as well as a first planetary gear set and a second planetary gear set. The planetary gear sets include multiple elements, wherein, preferably, a first element, a second element, and a third element are associated with each of the planetary gear sets. In addition, a first shift element, a second shift element, a third shift element, a fourth shift element, and a fifth shift element are provided, via the selective actuation of which different power paths can be implemented while shifting different gears. It is particularly preferred when at least four different gears can be formed between the first input shaft and the output shaft that differ in terms of ratio. Moreover, a rotor of the electric machine is connected to the second input shaft.

Within the meaning of the invention, a "shaft" is understood to be a rotatable component of the transmission, via which associated components of the transmission are rotationally fixed to each other or via which a connection of this type is established upon actuation of an appropriate shift element. The shaft can connect the components to each other axially or radially or even both axially and radially in this case. The particular shaft can also be present as an intermediate piece, via which a particular component is connected, for example, radially.

Within the meaning of the invention, the term "axially" means an orientation in the direction of an axis along which the planetary gear sets are arranged coaxially to each other. "Radially" is then understood to mean an orientation in the direction of the diameter of a shaft that lies on this axis.

Preferably, the output shaft of the transmission includes a tooth system, via which the output shaft is then operatively connected, in the motor vehicle drive train, to a differential gear arranged axially parallel to the output shaft. In this case, the tooth system is preferably provided at a mounting interface of the output shaft, wherein this mounting interface of the output shaft can be situated axially in the area of an end of the transmission, at which a mounting interface of the first input shaft is also provided, the mounting interface establishing the connection to the prime mover connected upstream therefrom. This type of arrangement is particularly suitable for the application in a motor vehicle with a drive train aligned transversely to the direction of travel of the motor vehicle.

Alternatively, an output shaft of the transmission can also be provided, however, at an axial end of the transmission situated opposite to a mounting interface of the first input shaft. In this case, a mounting interface of the output shaft is then designed at an axial end of the output shaft coaxially to a mounting interface of the first input shaft, so that the input and the output of the transmission are located at opposite axial ends of the transmission. A transmission configured in this way is suitable for the application in a motor vehicle with a drive train aligned in the direction of travel of the motor vehicle.

The planetary gear sets are preferably arranged in the sequence first planetary gear set and second planetary gear set axially following the mounting interface of the first input shaft. This sequence can also be reversed in example aspects, however, so that the second planetary gear set initially axially follows the mounting interface of the first input shaft.

Advantageously, a first element of the second planetary gear set is fixable at a rotationally fixed component via the first shift element, while a first element of the first planetary gear set is fixable at the rotationally fixed component via the second shift element. The first input shaft is rotationally fixable to the output shaft via the third shift element. In addition, the first input shaft is rotationally fixable to the first element of the first planetary gear set via the fourth shift element. In addition, the first input shaft is rotationally fixable to the second input shaft via the fifth shift element.

The output shaft of the transmission is rotationally fixed to a third element of the first planetary gear set and to a second element of the second planetary gear set. The second input shaft is rotationally fixed to a second element of the first planetary gear set and to a third element of the second planetary gear set.

The third, fourth, and fifth shift elements are preferably clutches, which, upon actuation, synchronize the components of the transmission, which are to be rotationally fixed to one another, with respect to turning motions of the components, if necessary and, thereafter, connect them to one another in a rotationally fixed manner. A synchronization of the shift element to be engaged during a gear shift can take place via a closed-loop control of the rotational speed of the internal combustion engine or via synchronized shift elements or via another central synchronization, such as a transmission brake or a further electric machine. A separating clutch can be provided for the internal combustion engine, in order to decouple the inertial mass of the internal combustion engine during the synchronization. In order to assist the synchronization, one further electric machine can be optionally utilized, which is operatively connected directly or indirectly to the input shaft.

The first shift element and the second shift element can be, in particular, brakes, which, upon actuation, fix the first element of the second planetary gear set and, consequently, prevent a turning motion thereof.

A particular rotationally fixed connection of the rotatable components of the transmission is preferably implemented, according to example aspects of the invention, via one or also multiple intermediate shaft(s), which can also be present, in this case, as short intermediate pieces when the components are positioned in a spatially dense manner. Specifically, the components that are permanently rotationally fixed to each other can each be present either as individual components that are rotationally fixed to each other, or also as single pieces. In the second case mentioned above, the particular components and the optionally present shaft are then formed by one common component, wherein this is implemented, in particular, for the case in which the particular components are situated spatially close to one another in the transmission.

In the case of components of the transmission that are connected to each other only upon actuation of a respective shift element, a connection is also preferably implemented via one or even multiple intermediate shafts.

A fixation takes place by way of a rotationally fixed connection to a rotationally fixed component of the transmission, which is preferably a permanently non-rotating component, preferably a housing of the transmission, a portion of such a housing, or a component rotationally fixed thereto.

Within the meaning of the invention, the "connection" of the rotor of the electric machine to the second input shaft of the transmission is to be understood as a connection between these of such a type that a constant rotational-speed dependence prevails between the rotor of the electric machine and the second input shaft. In this case, the electric machine can be arranged either coaxially to the planetary gear sets or so as to lie axially offset with respect thereto. In the former case, the rotor of the electric machine can either be rotationally fixed directly to the second input shaft or can be coupled thereto via one or also multiple intermediate gear stage(s), wherein the latter allows for a more favorable configuration of the electric machine with higher rotational speeds and lower torques. The at least one gear stage can be designed as a spur gear stage and/or as a planetary gear stage in this case. In the case of a coaxial arrangement of the electric machine, the two planetary gear sets are then also further preferably arranged axially in the area of the electric machine and radially within the electric machine, so that the axial installation length of the transmission can be shortened.

If the electric machine is provided axially offset with respect to the planetary gear sets, however, a coupling takes place via one or multiple intermediate gear stage(s) and/or a flexible traction drive mechanism. The one or the multiple gear stage(s) can also be implemented individually, in this case, either as a spur gear stage or as a planetary gear stage. A flexible traction drive mechanism can be either a belt drive or a chain drive.

Overall, a transmission according to example aspects of the invention is distinguished by a compact design, low component loads, good gearing efficiency, and low losses.

It is particularly preferred when precisely four gears or gear ratios are implementable between the first input shaft and the output shaft. It is further preferred when these four gears can be implemented via selective engagement, i.e., actuation, of the shift elements. Here, a first gear results between the input shaft and the output shaft by actuating the first shift element and the fourth shift element, whereas a second gear can be engaged between the first input shaft and the output shaft by actuating the first shift element and the fifth shift element. A third gear can be engaged between the input shaft and the output shaft in a first variant by actuating the first and the third shift elements. In a second variant, the third gear can be selected by engaging the second shift element and the third shift element. In a third variant, the third gear can be selected by engaging the third shift element and the fourth shift element. In a fourth variant, the third gear can be actuated by actuating the third shift element and the fifth shift element. Finally, in a fifth variant, the third gear can be engaged by actuating the fourth shift element and the fifth shift element. A fourth gear results between the first input shaft and the output shaft by actuating the second shift element and the fifth shift element.

Given a suitable selection of stationary transmission ratios of the planetary gear sets, a transmission ratio range which is suitable for the application in a motor vehicle is implemented as a result. In this case, gear shifts between the gears can be implemented, in which only the condition of two shift elements, in each case, is always to be varied, in that one of the shift elements contributing to the preceding gear is to be disengaged and another shift element is to be engaged in order to implement the subsequent gear. As a further consequence thereof, a shift between the gears can take place very rapidly. A further advantage is that a separating clutch is not necessary for purely electric driving.

Due to the connection of the electric machine to the second input shaft of the transmission, different operating modes can be achieved in a simple way. A first gear between the second input shaft and the output shaft can be utilized for purely electric driving, wherein this first gear results by actuating the first shift element. As a result, the rotor of the electric machine is connected to the output shaft via the second planetary gear set, wherein a ratio of this first gear corresponds to a ratio of the second gear, which is effective between the first input shaft and the output shaft.

In addition, a second gear can also be implemented between the second input shaft and the output shaft for purely electric driving. The second shift element is to be actuated in order to engage this second gear, so that the rotor of the electric machine is then connected to the output shaft via the first planetary gear set. A ratio of this second gear, which is effective between the second input shaft and the output shaft, corresponds to a ratio of the fourth gear, which is effective between the first input shaft and the output shaft.

In addition, an electrodynamic starting operation (EDA mode) can be implemented. Electrodynamic starting means that a speed superimposition of the rotational speed of the internal combustion engine, the rotational speed of the electric machine, and the rotational speed of the output shaft takes place via one or multiple planetary gear set(s), and so it is possible to pull away from rest while the internal combustion engine is running. The electric machine supports a torque in this case. If the fourth shift element is engaged, an electrodynamic starting condition arises at the first planetary gear set. The internal combustion engine drives the first element of the first planetary gear set, the electric machine supports the internal-combustion-engine torque at the second element of the first planetary gear set and the third element of the first planetary gear set is connected to the output shaft. In this way, a reverse electrodynamic starting operation is possible.

Starting from purely electric driving in the first gear, which is effective between the second input shaft and the output shaft, the upstream prime mover can then be started in the first gear or in the second gear or in the first variant of the third gear, which is effective between the first input shaft and the output shaft, since the first shift element contributes to each of these. Starting from purely electric driving in the second gear, which is effective between the second input shaft and the output shaft, the upstream prime mover can then be started in the second variant of the third gear or in the fourth gear, which is effective between the first input shaft and the output shaft, since the second shift element contributes to each of these.

As a further operating mode, a charging operation of an electric accumulator can also be implemented, in that only the fifth shift element is engaged and, thereby, a connection of the first input shaft to the electric machine is established and, thereby, a connection of the upstream prime mover to the electric machine is also established. At the same time, a force-fit connection to the output shaft is not established, and therefore the transmission is in a neutral position. Apart from a charging operation, a start of the upstream prime mover via the electric machine can also be implemented as a result.

Moreover, powershifts with tractive force support can be implemented. During the gearchange between the first gear, which is effective between the first input shaft and the output shaft, and the second gear, which is effective between the first input shaft and the output shaft, the tractive force with the first shift element engaged can be supported via the electric machine, wherein the synchronization of the shift element to be engaged takes place via a closed-loop control of the rotational speed of the upstream prime mover. Alternatively, however, this can also take place by using synchronized shift elements or also by using another, separate synchronizing mechanism, such as a transmission brake or also one further electric machine, which can be operatively connected directly or indirectly to the first input shaft. If one further shift element, as a separating clutch, is also provided on the input side of the input shaft, the inertial mass of the upstream drive machine can be decoupled during the synchronization.

A gearchange under load can also take place between the second gear, which is effective between the first input shaft and the output shaft, and the first variant of the third gear, which is effective between the first input shaft and the output shaft, with the first shift element engaged.

A gearchange under load can also take place between the second variant of the third gear, which is effective between the first input shaft and the output shaft, and the fourth gear, which is effective between the first input shaft and the output shaft, with the second shift element engaged.

In addition, it becomes possible to reduce the rotational speed of the rotor shaft in the mechanical operating mode or in the hybrid operating mode. After an electrically assisted gear shift from the second gear into the third gear, or after a start of the internal combustion engine into the third gear, travel in the hybrid mode in the first variant of the third gear initially results, since the first shift element, which is engaged for the preceding electrical tractive force support or for the preceding purely electric mode, initially remains engaged. In order to reduce the rotor rotational speed in the third gear at higher ground speeds, a changeover can be carried out from the first variant of the third gear into the second variant of the third gear, since the rotor shaft has a lower rotational speed in this case than in the first variant of the third gear. This changeover takes place while preserving the tractive force via the internal combustion engine. A load-free shift element is disengaged, namely the first shift element, and another load-free shift element is engaged, namely the second shift element. The rotational-speed adaptation takes place via closed-loop control of the rotational speed with the electric machine. Due to the changeover into the second variant of the third gear, a subsequent gear shift into the fourth gear is also prepared. The advantage lies in the fact that the internal combustion engine, on the one hand, can be decoupled at any time by disengaging the third shift element also without an additional separating clutch, while the electric machine drives or decelerates the vehicle (recuperation). On the other hand, in the case of a vehicle that is slowing down, a downshift from the third gear into the second gear can be prepared, in that a changeover is carried out from the second variant of the third gear into the first variant of the third gear, while the internal combustion engine maintains the tractive force (the third shift element remains engaged). In the first variant of the third gear, the first shift element is engaged, which becomes necessary in order to support the tractive force with the electric machine during the downshift from the third gear into the second gear.

In addition, travel is possible with the electric machine decoupled. In the third mechanical or internal-combustion-engine gear, when the third shift element is engaged, the electric machine can be decoupled, since, here, only the third shift element is loaded with torque and, in addition, the rotor shaft can remain idle. As a result, zero-load losses of the electric machine can be avoided during purely internal combustion engine-driven travel in the third gear, such as during longer highway travel.

In addition, in the case of a vehicle that is slowing down, a downshift from the third gear, which is effective between the first input shaft and the output shaft, into the second gear, which is effective between the first input shaft and the output shaft, can be prepared, in that, initially, a changeover takes place from the second variant into the first variant of the third gear and, in the process, the tractive force is obtained via the upstream prime mover, with the third shift element engaged. In the first variant of the third gear, the first shift element is engaged, which becomes necessary in order to support the tractive force via the electric machine as part of the downshift from the third gear into the second gear.

As one further example design option of the invention, a further electric machine is provided, the rotor of which is connected to the input shaft. Such an example embodiment has the advantage that further driving modes can be achieved as a result. In addition, as a result, a start of the upstream prime mover can be implemented immediately, if necessary, if the prime mover is designed as an internal combustion engine. In addition, the additional electric machine can support the upstream prime mover during the synchronization of shift elements. The further electric machine can also be arranged coaxially or axially offset, wherein the intermediate connection of one or also multiple gear stage(s) is conceivable in this case as well.

According to one further example embodiment of the invention, the first input shaft is rotationally fixable to the first element of the second planetary gear set via a sixth shift element. One further electrodynamic condition (EDA mode) can be implemented by adding one further shift element, which, in the actuated condition, connects the first input shaft to the first element of the second planetary gear set. When the further shift element is engaged, an electrodynamic condition arises at the second planetary gear set. The prime mover drives the first element of the second planetary gear set, the electric machine supports the torque of the prime mover at the third element of the second planetary gear set and the second element of the second planetary gear set is connected to the output shaft. In this way, a forward electrodynamic starting operation is possible.

Due to the addition of the sixth shift element, three further shift combinations result for the third gear. Here, a third gear results between the first input shaft and the output shaft in a sixth variant by actuating the sixth shift element and the third shift element, whereas a seventh variant of the third gear results by actuating the sixth shift element and the fifth shift element, and an eighth variant of the third gear results by actuating the sixth shift element and the fourth shift element.

Additionally, for the EDA starting operation, the sixth shift element allows for one further additional gear between the first input shaft and the output shaft.

According to one further example embodiment of the invention, a seventh shift element is provided. The seventh shift element is arranged and designed in such a way that, in the actuated condition, the seventh shift element connects two elements of the first planetary gear set or of the second planetary gear set to one another in a rotationally fixed manner, i.e., interlocks the two elements. If one planetary gear set is interlocked, the ratio is always one regardless of the number of teeth. In other words, the planetary gear set revolves as a block.

Preferably, the interlock takes place in such a way that, by the seventh shift element in the actuated condition, either
 the first element of the first planetary gear set and the second element of the first planetary gear set are connected to each other in a rotationally fixed manner,
 the third element of the first planetary gear set and the second element of the first planetary gear set are connected to each other in a rotationally fixed manner,
 the first element of the second planetary gear set and the second element of the second planetary gear set are connected to each other in a rotationally fixed manner, or
 the third element of the second planetary gear set and the second element of the second planetary gear set are connected to each other in a rotationally fixed manner.

By adding the seventh shift element, one additional gear can be implemented between the second input shaft and the output shaft. The ratio of the additional electric gear is situated between the ratio of the first gear, which is effective between the second input shaft and the output shaft, and the ratio of the second gear, which is effective between the second input shaft and the output shaft. Only the seventh shift element is actuated in this additional electric gear.

It is pointed out here that the sixth shift element and the seventh shift element can be added to the transmission with five shift elements independently of each other. The sixth shift element and the seventh shift element can therefore each be present alone with the first five shift elements or sixth shift element and the seventh shift element can be present in combination therewith.

In addition, a transmission is preferred, wherein an eighth shift element is provided, which is arranged and situated in such a way that, in the actuated condition, to rotationally fix the second input shaft to the rotationally fixed component. Due to the addition of one further additional shift element, which, in the actuated condition, therefore connects the rotor shaft to, for example, the housing of the transmission, a mechanical reverse gear can be implemented. The mechanical reverse gear results by engaging the fourth shift element and the eighth shift element. The eighth shift element is also neither structurally nor functionally coupled to the sixth shift element and/or the seventh shift element. The eighth shift element can be utilized in combination therewith, however.

In addition, a transmission is preferred, wherein a ninth shift element is provided in the form of a shift element pair or a double shift element, which is arranged and designed for
 connecting the rotor of the first electric machine to the first element of the first planetary gear set, in a first shift position, or
 connecting the rotor of the first electric machine to the second element of the first planetary gear set, in a second shift position, or
 transferring the rotor of the first electric machine into a third, neutral position.

In the neutral position, the rotor connected to the second input shaft is decoupled, i.e., connected neither to the first nor to the second element of the first planetary gear set.

A first advantage of the shift element pair is that, due to the coupling of the rotor to the first element of the first planetary gear set, one further short electric gear is made available when the first shift element is engaged. This electric gear has a higher ratio than the first electric gear, i.e., the first gear between the second input shaft and the output shaft. The further short electric gear can be advantageously selected for the case in which particularly high demands are placed on the starting torque. The additional short electric gear is also advantageous during longer serial travel on up-hill gradients, because the electric machine does not need to provide as much torque as in the first gear between the second input shaft and the output shaft. As a result, the heat losses of the electric machine are reduced.

One further advantage that results due to the addition of the shift element pair is the possibility of decoupling the electric machine. This increases the efficiency, because zero-load losses of the electric machine can be avoided due to the decoupling. It is pointed out in this case as well that the ninth shift element, i.e., the shift element pair, is neither structurally nor functionally connected to the sixth, seventh, and eighth shift elements. The ninth shift element can be utilized in any combination with the aforementioned shift elements.

It is further preferred when the first input shaft is rotationally fixable to a connection shaft via a tenth shift element. The connection shaft, in turn, is coupled to the prime mover upstream from the transmission. The tenth shift element can be designed, in principle, as a force-locking or also as a form-locking shift element in this case, although it is particularly preferred when it is present as a dog clutch. Via the tenth shift element, the upstream prime mover can therefore also be completely decoupled from the transmission, so that a purely electric operation is implementable in a problem-free manner. The tenth shift element is also neither structurally nor functionally coupled to the sixth, seventh, eighth, and/or ninth shift element(s).

In one example refinement of the invention, one or multiple shift element(s) is/are each implemented as a form-locking shift element. In this case, the particular shift element is preferably designed either as a constant-mesh shift element or as a lock-synchronizer mechanism. Form-locking shift elements have the advantage over friction-locking shift elements that lower drag losses occur in the disengaged condition, and therefore a better efficiency of the transmission can be achieved. In particular, in the transmission according to example aspects of the invention, all shift elements are implemented as form-locking shift elements, and therefore the lowest possible drag losses can be achieved.

A transmission is preferred, wherein at least two shift elements are combined to form a shift element pair, with which one actuating element is associated, wherein the one shift element, on the one hand, and the other shift element, on the other hand, are actuatable from a neutral position via the actuating element.

In addition, a transmission is preferred, wherein at least four shift elements are combined to form two shift element pairs, with each of which one actuating element is associated, wherein the one shift element in each case, on the one hand, and the other shift element in each case, on the other hand, are actuatable from a neutral position via the actuating element.

It is further preferred when at least six shift elements are combined to form three shift element pairs, with each of which one actuating element is associated, wherein the one shift element in each case, on the one hand, and the other shift element in each case, on the other hand, are actuatable from a neutral position via the actuating element.

According to one further example embodiment of the invention, the first shift element and the second shift element are combined to form a shift element pair, with which one actuating element is associated. The first shift element, on the one hand, and the second shift element, on the other hand, can be actuated via the actuating element starting from a neutral position. This has the advantage that, due to this combination, the number of actuating elements can be reduced and, thereby, the manufacturing complexity can also be reduced.

Alternatively or also in addition to the aforementioned example variants, the third shift element and the fifth shift element are combined to form a shift element pair, with which one actuating element is associated. The third shift element, on the one hand, and the fifth shift element, on the other hand, can be actuated via this actuating element starting from a neutral position. As a result, the manufacturing complexity can be reduced, in that, due to the combination of the two shift elements to form a shift element pair, one actuating unit can be utilized for both shift elements.

It is particularly preferred, however, when both aforementioned shift element pairs are implemented, so that the five shift elements of the transmission can be actuated via three actuating elements. As a result, a particularly low manufacturing complexity can be achieved.

In the case of the example embodiment with the sixth shift element, it is preferred when the first shift element and the second shift element are designed as a shift element pair and/or the third shift element and the fifth shift element are designed as a shift element pair and/or the fourth shift element and the sixth shift element are designed as a shift element pair.

In addition, in the case of the example embodiment with the sixth shift element, it is preferred when the first shift element and the second shift element are designed as a shift element pair and/or the third shift element and the fourth shift element are designed as a shift element pair and/or the fifth shift element and the sixth shift element are designed as a shift element pair.

It is particularly preferred when the six shift elements are combined to form three shift element pairs, since, as a result, the six shift elements of the transmission can be actuated via three actuating elements. As a result, a particularly low manufacturing complexity can be achieved.

If the transmission according to example aspects of the invention includes a sixth shift element and a seventh shift element, it is preferred when two and/or four and/or six shift elements are combined, in each case, to form a shift element pair. If the seventh shift element is arranged in such a way that the seventh shift element interlocks the first planetary gear set in the actuated condition, it is preferred that the second shift element and the seventh shift element and/or the third shift element and the fifth shift element and/or the fourth shift element and the sixth shift element are combined, in each case, to form a shift element pair. In addition, it is preferred when the second shift element and the seventh shift element and/or the third shift element and the fourth shift element and/or the fifth shift element and the sixth shift element are combined, in each case, to form a shift element pair. In both cases, the first shift element is single actuator. If the seventh shift element is arranged in such a way that the seventh shift element interlocks the second planetary gear set in the actuated condition, it is preferred that the first shift element and the eighth shift element, the third shift element and the fifth shift element and/or the fourth shift element and the sixth shift element are combined, in each case, to form a shift element pair. In addition, it is preferred when the first shift element and the eighth shift element and/or the third shift element and the fourth shift element and/or the fifth shift element and the sixth shift element are combined, in each case, to form a shift element pair. In the two latter cases, the second shift element is designed as a single actuator.

Within the scope of example aspects of the invention, the planetary gear sets can each be a minus planetary gear set, provided it allows for a connection of the elements, wherein the first element of the particular planetary gear set is a sun gear, the second element of the particular planetary gear set is a planet carrier, and the third element of the particular planetary gear set is a ring gear. A minus planetary gear set is composed, in a way known, in principle, to a person skilled in the art, of the elements sun gear, planet carrier, and ring gear, wherein the planet carrier, rotatably mounted, guides at least one planet gear, although preferably multiple planet gears, which each individually intermesh with the sun gear and with the surrounding ring gear.

Alternatively thereto, one planetary gear set or also multiple planetary gear sets can also be a plus planetary gear set, however, provided it allows for the connection of the particular elements, wherein the first element of the particular planetary gear set is then a sun gear, the second element of the particular planetary gear set is a ring gear, and the third element of the particular planetary gear set is a planet carrier. In a plus planetary gear set as well, the elements sun gear, ring gear, and planet carrier are present, wherein the latter guides at least one planet gear pair, in which one planet gear is meshed with the internal sun gear and the other planet gear is meshed with the surrounding ring gear, and the planet gears are intermeshed with each other.

Where permitted by a connection of the individual elements, a minus planetary gear set can be converted into a plus planetary gear set, wherein, as compared to the design as a minus planetary gear set, the ring gear connection and the planet carrier connection are to be interchanged, and a stationary transmission ratio is to be increased by one. Conversely, a plus planetary gear set could also be replaced by a minus planetary gear set, provided the connection of the elements of the transmission enables this. In this case, as compared to the plus planetary gear set, the ring gear connection and the planet carrier connection would also need to be interchanged, and a stationary transmission ratio would need to be reduced by one. Preferably, the first planetary gear set and the second planetary gear set are present as minus planetary gear sets, wherein an optionally present, third planetary gear set is also preferably designed as a minus planetary gear set.

Within the scope of example aspects of the invention, a starting component can be installed upstream from the transmission, for example a hydrodynamic torque converter or a friction clutch. This starting component can then also be an integral part of the transmission and acts to configure a starting process, in that the starting component enables a slip speed between the prime mover, which is designed, in particular, as an internal combustion engine, and the first input shaft of the transmission. In this case, one of the shift elements of the transmission or the separating clutch, which may be present, can also be designed as such a starting component, in that the starting component is present as a frictional shift element. In addition, a one-way clutch with respect to the transmission housing or to another shaft can be arranged on each shaft of the transmission, in principle.

The transmission according to example aspects of the invention is, in particular, part of a motor vehicle drive train for a hybrid or electric vehicle and is then arranged between a prime mover of the motor vehicle, which is configured as an internal combustion engine or as an electric machine, and further components of the drive train, which are arranged downstream in the direction of power flow to driving wheels of the motor vehicle. In this case, the first input shaft of the transmission is either permanently coupled to a crankshaft of the internal combustion engine or to the rotor shaft of the electric machine in a rotationally fixed manner or can be connected thereto via an intermediate separating clutch or a starting component, wherein a torsional vibration damper can also be provided between an internal combustion engine and the transmission. On the output end, the transmission is then preferably coupled, within the motor vehicle drive train, to a differential gear of a drive axle of the motor vehicle, wherein a connection to an interaxle differential can also be present in this case, however, via which a distribution to multiple driven axles of the motor vehicle takes place. The differential gear or the interaxle differential can be arranged with the transmission in one common housing in this case. A torsional vibration damper, which is optionally present, can also be integrated into this housing.

Within the meaning of the invention, the expressions that two components of the transmission are "connected" or "coupled" in a rotationally fixed manner or "are connected to each other" mean a permanent coupling of these components, and therefore said components cannot rotate independently of each other. In that respect, no shift element is provided between these components, which can be elements of the planetary gear sets and/or even shafts and/or a rotationally fixed component of the transmission. Instead, the corresponding components are rigidly connected to each other with a constant rotational speed dependence.

However, if a shift element is provided between two components, these components are not permanently coupled to each other in a rotationally fixed manner. Instead, a rotationally fixed coupling is carried out only by actuating the intermediate shift element. In this case, an actuation of the shift element means, within the meaning of the invention, that the respective shift element is transferred into an engaged condition and consequently synchronizes the turning motions of the components coupled directly thereto. In the case of an example embodiment of the particular shift element as a form-locking shift element, the components directly connected to each other in a rotationally fixed manner via the shift element rotate at the same rotational speed, while, in the case of a force-locking shift element, speed differences can exist between the components also after an actuation of the same shift element. This intentional or also unintentional condition is nevertheless referred to, within the scope of the invention, as a rotationally fixed connection of the particular components via the shift element.

BRIEF DESCRIPTION OF THE DRAWINGS

Further advantageous example embodiments of the invention, which are explained in the following, are represented in the drawings. Wherein

FIG. 4 shows an exemplary shift pattern of the transmissions from FIGS. 2 and 3;

FIG. 7 shows an exemplary shift pattern of the transmissions from FIGS. 5 and 6;

FIGS. 17 through 23 each show a schematic of a modification of the aforementioned transmissions;

DETAILED DESCRIPTION

Figure 1:
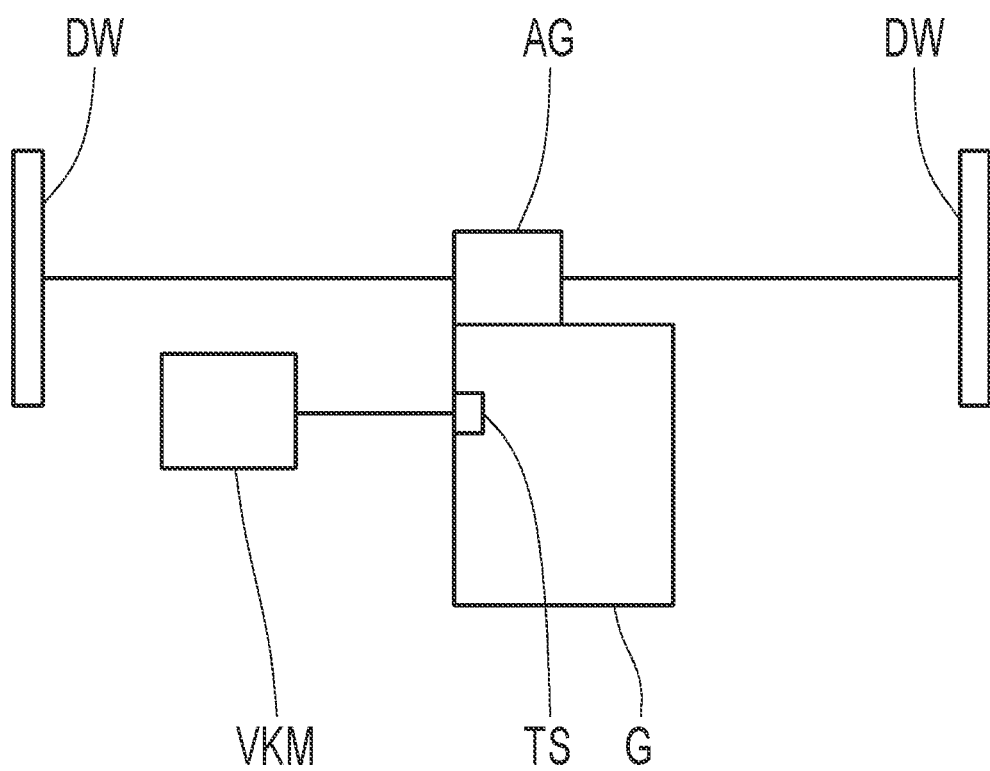
FIG. 1 shows a diagrammatic view of a motor vehicle drive train according to a first embodiment.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a diagrammatic view of a motor vehicle drive train of a hybrid vehicle, wherein, in the motor vehicle drive train, an internal combustion engine VKM is connected to a transmission G via an intermediate torsional vibration damper TS. Connected downstream from the transmission G, on the output end thereof, is a differential gear AG, via which drive power is distributed to driving wheels DW of a drive axle of the motor vehicle. The transmission G and the torsional vibration damper TS are arranged in a common housing of the transmission G in this case, into which the differential gear AG can then also be integrated. As is also apparent in FIG. 1, the internal combustion engine VKM, the torsional vibration damper TS, the transmission G, and also the differential gear AG are aligned transversely to a direction of travel of the motor vehicle.

Figure 2:
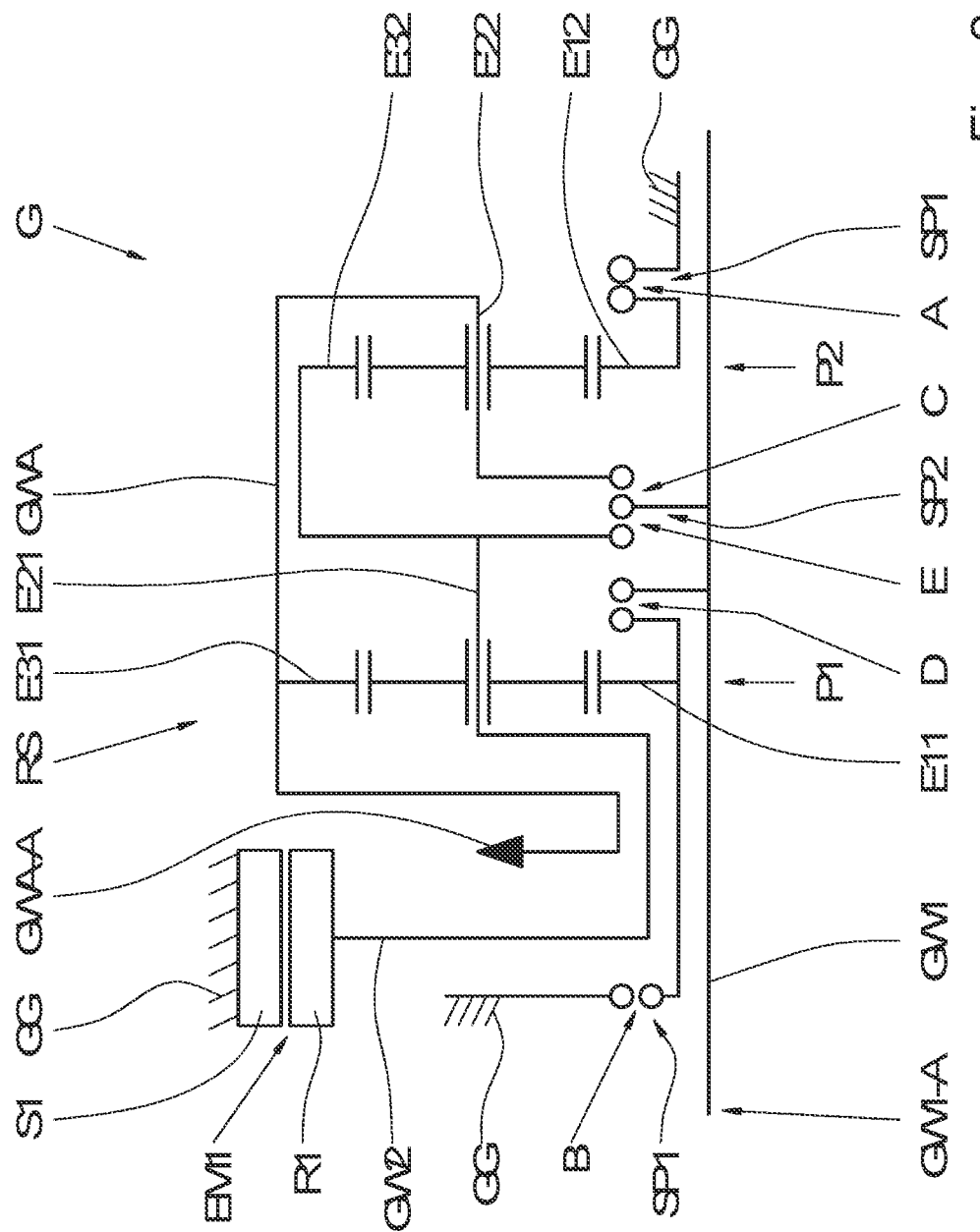
FIGS. 2, 3 each show a diagrammatic view of a transmission of the type that can be utilized in the motor vehicle drive train from FIG. 1.

FIG. 2 shows a schematic of the transmission G according to a first embodiment of the invention. As is apparent in FIG. 2, the transmission G includes a first input shaft GW1, a second input shaft GW2, and an output shaft GWA, which are situated coaxially to one another. In addition, the transmission G includes two planetary gear sets P1 and P2, which include a first element E11 and E12, respectively, a second element E21 and E22, respectively, and a third element E31 and E32, respectively, and are also arranged coaxially to the input shafts GW1 and GW2 and to the output shaft GWA. The first element E11 or E12 of the planetary gear set P1 or P2, respectively, is formed by a respective sun gear, while the second element E21 or E22 of the planetary gear set P1 or P2, respectively, is a planet carrier. Finally, the third element E31 or E32 of the planetary gear set P1 or P2, respectively, is a respective ring gear of the planetary gear set P1 or P2, respectively.

In the present case, the two planetary gear sets P1 and P2 are present as minus planetary gear sets, in that the respective planet carrier, rotatably mounted, guides at least one planet gear, which is meshed with the respective radially internal sun gear and with the respective surrounding ring gear. Preferably, however, in the case of the first planetary gear set P1 and in the case of the second planetary gear set P2, multiple planet gears are guided by the respective planet carrier, which then individually intermesh with the respective sun gear and with the respective ring gear.

As is also apparent from FIG. 2, the element E12 of the second planetary gear set P2 is fixable at a rotationally fixed component GG of the transmission G via a first shift element A. In the fixed condition, the element E12 is prevented from making a turning motion. The element E11 of the first planetary gear set P1, however, is fixable with a second shift element B at the rotationally fixed component GG of the transmission G. If the element E11 is fixed, the element E11 is prevented from making a turning motion.

The input shaft GW1 is rotationally fixable to the output shaft GWA via a third shift element C. In addition, the input shaft GW1 is rotationally fixable to the first element E11 of the first planetary gear set P1 via a fourth shift element D. In addition, the input shaft GW1 is rotationally fixable via a fifth shift element E to the second element E21 of the first planetary gear set P1 and to the third element E32 of the second planetary gear set P2.

The second input shaft GW2 is rotationally fixed to a rotor R1 of an electric machine EM1 of the transmission G, wherein the electric machine EM1 is provided coaxially to the two planetary gear sets P1 and P2. The electric machine EM1 is arranged axially adjacent to the first planetary gear set P1, and so, starting from a transmission input, an axial sequence results: first electric machine EM1, first planetary gear set P1, and second planetary gear set P2. A stator S1 of the electric machine EM1 is fixed at a rotationally fixed component GG of the transmission G, which is, in particular, the housing of the transmission G or a portion of the housing. Moreover, the second input shaft GW2 is permanently connected in a rotationally fixed manner to the second element E21 of the first planetary gear set P1 and to the third element E32 of the second planetary gear set P2, so that the rotor R1 of the electric machine EM1 is also permanently rotationally fixed to the two elements E21 and E32.

It is also apparent in FIG. 2 that the output shaft GWA is rotationally fixed to the third element E31 of the first planetary gear set P1 and to the second element E22 of the second planetary gear set P2.

The first, second, third, fourth, and fifth shift elements A, B, C, D, and E are each designed as form-locking shift elements in the present case. The shift elements third, fourth, and fifth C, D, and E are each specifically present as dog clutches. The first shift element A and the second shift element B are each a brake, however.

The third shift element C, the fourth shift element D, and the fifth shift element E are axially arranged between the first planetary gear set and the second planetary gear set. The first shift element A, viewed axially, is arranged at a side of the second planetary gear set P2 facing away from the transmission input. The second shift element B, however, viewed axially, is arranged at a side of the first planetary gear set P1 facing the transmission input.

The first shift element A and the second shift element B are combined to form a shift element pair SP1, in that a common actuating element is associated with the first shift element A and the second shift element B. Via this actuating element, the first shift element A, on the one hand, and the second shift element B, on the other hand, can be actuated from a neutral position.

The third shift element C and the fifth shift element E are located axially directly next to each other and are also combined to form a shift element pair, namely a shift element pair SP2, in that a common actuating element is associated with the third shift element C and the fifth shift element E. Via this actuating element, the third shift element C, on the one hand, and the fifth shift element E, on the other hand, can be actuated from a neutral position. The fourth shift element D is designed as a single actuator.

The combination to form a shift element pair is possible, therefore, since the shift elements do not need to be engaged simultaneously in a gear.

Figure 3:
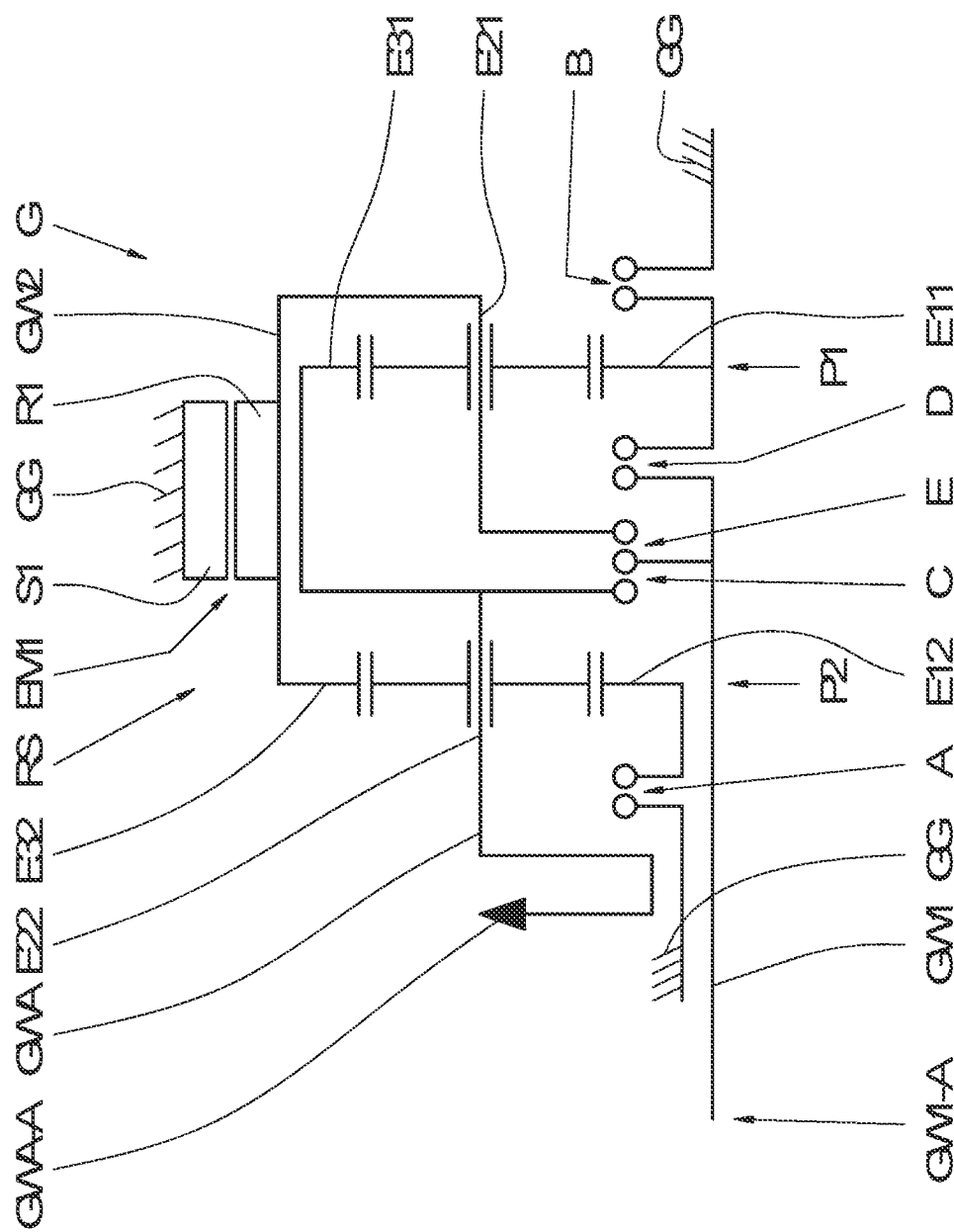

FIG. 3 shows an example modification that largely corresponds to the example variant of the preceding FIG. 2. In contrast thereto, however, the sequence of the two planetary gear sets P1, P2 has been interchanged. This results in a different arrangement of the first electric machine EM1. The first electric machine EM1 is now located axially essentially at the level of the two planetary gear sets P1 and P2 and radially surrounding the two planetary gear sets P1 and P2. While retaining the particular connections, the axial sequence now results as follows: first shift element A, second planetary gear set P2, third shift element C, fifth shift element E, fourth shift element D, first planetary gear set P1 and second shift element B, wherein the second shift element B is arranged at an axial end of the transmission G positioned opposite the first input shaft GW1. For the rest, the example variant according to FIG. 3 corresponds to the example embodiment according to FIG. 2, and therefore reference is made to the description thereof.

FIG. 4 shows an exemplary shift pattern for the transmissions of the motor vehicle drive trains from FIGS. 2 and 3 in table form. As is apparent, a total of four gears 1 through 4 can be implemented between the first input shaft GW1 and the output shaft GW2 in this case, wherein, in the columns of the shift pattern, an x indicates which of the shift elements A, B, C, D, and E is engaged in which of the gears 1 through 4. Two of the shift elements A, B, C, D, and E are engaged in each of the gears 1 through 4.

As is apparent in FIG. 4, a first gear 1 is engaged between the first input shaft GW1 and the output shaft GWA by actuating the first shift element A and the fourth shift element D. On the basis thereof, a second gear 2, which is effective between the first input shaft GW1 and the output shaft GWA, is formed, in that the fourth shift element D is disengaged and the fifth shift element E is engaged.

Starting from the second gear 2, a third gear, which is effective between the first input shaft GW1 and the output shaft GWA, is formed in a first variant H3.1, in that the fifth shift element E is disengaged and the third shift element C is engaged. In order to prepare a gear shift into the fourth gear 4, which is effective between the first input shaft GW1 and the output shaft GWA, a changeover is carried out in advance into a second variant 3.2, thereafter into a third variant 3.3, thereafter into a fourth variant 3.4, and thereafter into a fifth variant 3.8 of the third gear. The second variant 3.2 is selected in that the first shift element A is disengaged and the second shift element B is engaged. The third variant 3.3 is implemented in that the second shift element B is disengaged and the fourth shift element D is engaged. The fourth variant 3.4 is selected in that the fourth shift element D is disengaged and the fifth shift element E is engaged. Starting from the fourth variant 3.4, the fifth variant 3.8 is selected in that the third shift element C is disengaged and the fourth shift element D is engaged. Starting from the fifth variant 3.8, a changeover into the fourth gear 4 is then implemented, in that the fourth shift element D is disengaged and the second shift element B is engaged.

Although the shift elements A, B, C, D, and E are each designed as form-fit shift elements, a power shift can be implemented between the first gear 1 and the second gear 2, between the second gear 2 and the first variant 3.1 of the third gear 3, and between the second variant 3.2 of the third gear and the fourth gear 4. The tractive force is supported via the electric machine EM1 during a gearchange between the first gear 1 and the second gear 2 with the first shift element A engaged. The tractive force is also supported via the electric machine EM1 during a changeover between the second gear 2 and the first variant 3.1 of the third gear with the first shift element A engaged. The tractive force is also supported via the electric machine EM1 during a changeover from the second variant 3.2 of the third gear into the fourth gear 4 with the second shift element B engaged. The synchronization of the particular shift element C or E to be engaged is implemented by a closed-loop control of the rotational speed of the internal combustion engine VKM. The above-described gears 1 through 4 are hybrid gears, since the gears 1 through 4 are implemented with the aid of the internal combustion engine VKM and the electric machine EM1.

The transmissions G from FIGS. 2 and 3 can also be operated in alternative operating modes with the aid of the electric machine EM1. Purely electric driving can take place in a first gear E2, which is effective between the second input shaft GW2 and the output shaft GWA and, for the implementation of which, the first shift element A is to be transferred into an engaged condition. By engaging the first shift element A, the first electric machine EM1 is connected to the output shaft with a constant ratio. This means, the rotational speed of the rotor R1 is transmitted, with the first element E12 held in place, from the third element E32 onto the second element E22 of the second planetary gear set. The purely electric driving in the first gear E2 is then implemented with a ratio that corresponds to a ratio of the second gear 2. In this operating mode, the internal combustion engine is decoupled from the drive train, since only the first shift element is activated. Starting from the first gear E2, a start of the internal combustion engine VKM into the gears 1, 2, and 3.1 can take place, since the first shift element A also contributes to each of gears 1, 2, and 3.1. Therefore, a transition from purely electric driving into driving via the internal combustion engine or into hybrid driving can be carried out rapidly.

In addition, a second gear E4 can be utilized for purely electric driving, which is also effective between the second input shaft GW2 and, thereby, the rotor R1 of the electric machine EM1 and the output shaft GWA. In order to implement the second gear E4, the second shift element B is to be engaged, and so the rotor R1 is then connected to the output shaft, i.e., the output shaft GWA, via a constant ratio. This means, the rotational speed of the rotor R1 is transmitted, with the first element E11 held in place, from the second element E21 onto the third element E31 of the first planetary gear set. The purely electric driving is then implemented with a ratio that corresponds to the fourth gear. In this operating mode, the internal combustion engine VKM is decoupled from the drive train.

Starting from the second gear E4, a start of the internal combustion engine VKM into the gears 3.2 and 4 can take place, since the second shift element B also contributes to each of the gears 3.2 and 4.

Finally, a charging or start function can be implemented by engaging the fifth shift element E. This is the case because, in the engaged condition of the fifth shift element E, the first input shaft GW1 is directly coupled to the second input shaft GW2 and, thereby, also to the rotor R1 of the electric machine EM1, and so the internal combustion engine VKM is also coupled to the electric machine EM1 within the particular drive train. At the same time, there is no force-fit connection to the output shaft GWA, however, wherein the rotor R1 and the first input shaft GW1 run, i.e., rotate, at the same rotational speed. When the electric machine EM1 is operated as a generator, an electric accumulator can be charged via the internal combustion engine VKM, whereas, when the electric machine EM1 is operated as an electric motor, a start of the internal combustion engine VKM can be implemented via the electric machine EM1.

It is also apparent from FIG. 4 that a purely mechanical or internal-combustion-engine gear V3 is implementable by engaging the third shift element C. In the internal-combustion-engine gear V3, the electric machine EM1 is decoupled from the drive train. By driving in the internal-combustion-engine gear V3, zero-load losses of the electric machine EM1 can be advantageously avoided, such as during longer highway travel.

Figure 5:
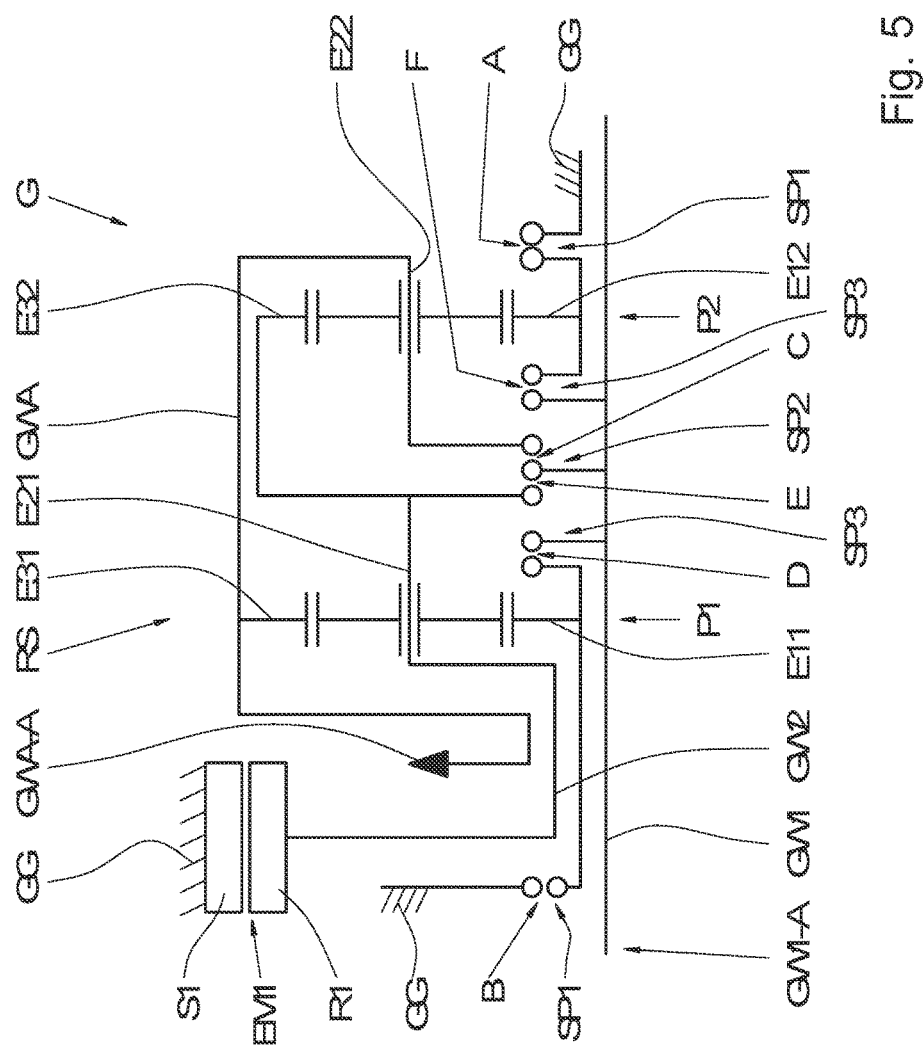
FIGS. 5, 6 each show a diagrammatic view of a transmission of the type that can also be utilized in the motor vehicle drive train from FIG. 1.

FIG. 5 shows a schematic of a transmission according to one further example variant, which largely corresponds to the example embodiment from FIGS. 2 and 3. In contrast to the aforementioned example embodiments, a sixth shift element F is now provided. The sixth shift element F is arranged in such a way that, in the actuated condition, the sixth shift element F rotationally fixes the first input shaft GW1 to the first element E12 of the second planetary gear set P2. If the sixth shift element F is actuated, i.e., engaged, a electrodynamic condition (EDA mode) arises at the second planetary gear set P2. The internal combustion engine VKM drives the first element E12 of the second planetary gear set P2, while the electric machine EM1 supports the torque of the internal combustion engine VKM at the third element E32 of the second planetary gear set P2. Since the second element E22 of the second planetary gear set P2 is rotationally fixed to the output shaft GWA, a forward electrodynamic starting operation is possible (EDA-V).

The six shift elements are combined to form three shift element sets or pairs. Here, the first shift element A and the second shift element B form a first shift element pair SP1, the third shift element C and the fifth shift element E form the shift element pair SP2, and the fourth shift element D and the sixth shift element F form the shift element pair SP3. It is also conceivable that the shift elements C and F are combined to form a shift element pair SP2 and the shift elements D and E are combined to form a shift element pair SP3. For the rest, the example variant according to FIG. 5 corresponds to the example embodiment according to FIG. 2, and therefore reference is made to the description thereof. With respect to the actuation of the four shift elements C, D, E, and F by only two actuators, reference is made to the example embodiment according to FIGS. 24 through 30.

Figure 6:
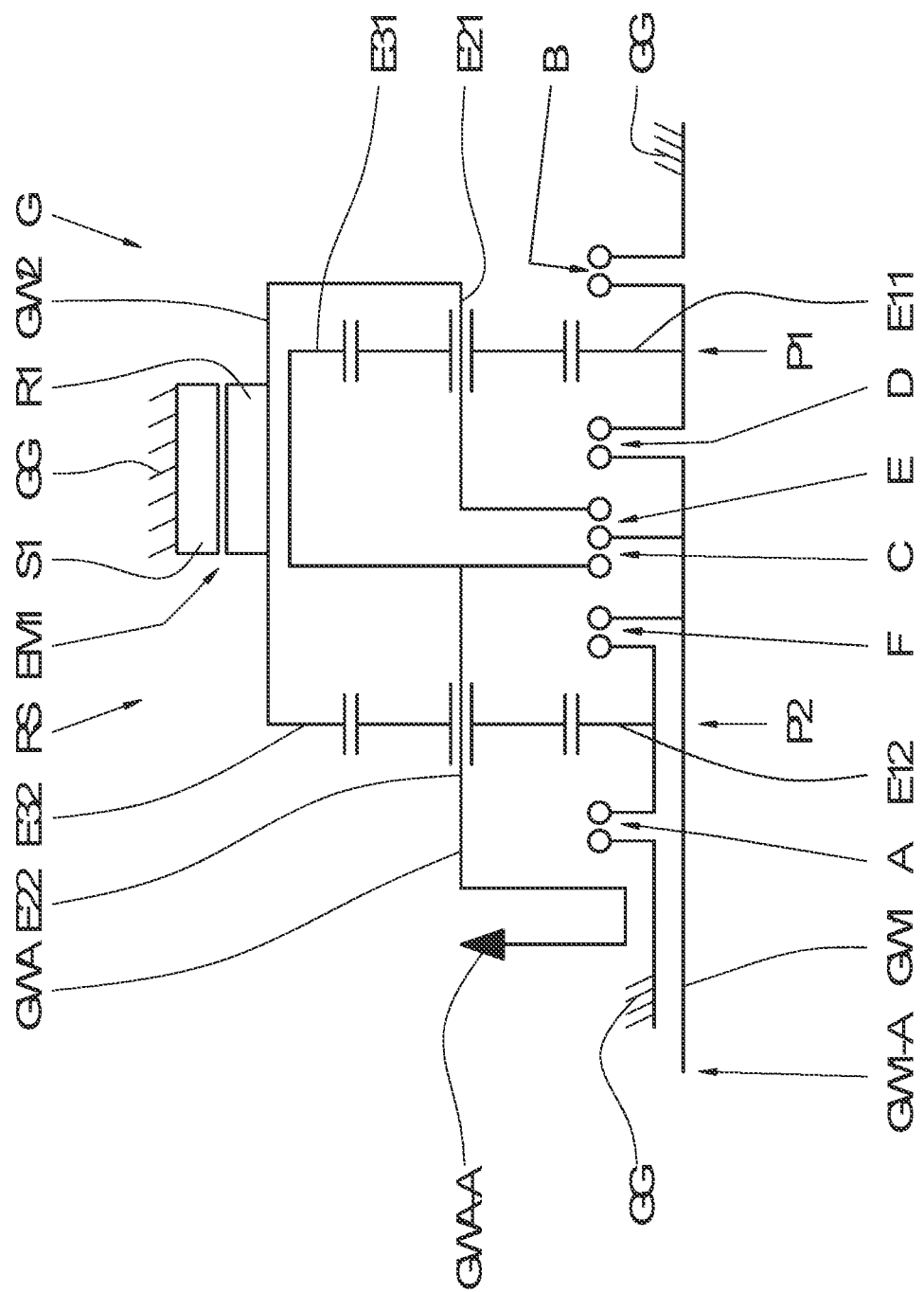

FIG. 6 shows a diagrammatic view of a transmission according to one further example variant, wherein, in contrast to the example variant according to FIG. 5, the sequence of the planetary gear sets P1 and P2 has been interchanged. One further difference relates to the connection of the first electric machine EM1, which is not arranged axially adjacent to the two planetary gear sets P1 and P2, but rather is located axially essentially at the level of the two planetary gear sets P1 and P2 and radially surrounding these. While retaining the connection of the other elements, an axial sequence results as follows: first shift element A, second planetary gear set P2, sixth shift element F, third shift element C, fifth shift element E, fourth shift element D, first planetary gear set P1 and second shift element B, wherein the second shift element B is arranged at an axial end of the transmission G positioned opposite the first input shaft GW1. For the rest, the example variant according to FIG. 6 corresponds to the example embodiment according to FIG. 5, and therefore reference is made to the description thereof.

FIG. 7 shows an exemplary shift pattern for the transmissions of the example embodiment according to FIGS. 5 and 6. Since the shift pattern from FIG. 7 is identical to the shift pattern from FIG. 4 except for a few differences, only the differences brought about by the addition of the sixth shift element F are to be addressed. Due to the sixth shift element F, three further variants or shift combinations for the gear 3 as well as an additional gear Z1 result. The third gear 3 therefore has a sixth variant 3.5, a seventh variant 3.6, and an eighth variant 3.7. Starting from the fourth variant known from FIG. 4, in order to change over into the sixth variant 3.5, the fifth shift element is disengaged and the sixth shift element is engaged. For the changeover from the sixth variant 3.5 into the seventh variant 3.6, the third shift element C is disengaged and the fifth shift element E is engaged. For the changeover from the seventh variant 3.6 into the eighth variant 3.7 of the third gear 3, the fifth shift element E is disengaged and the fourth shift element D is engaged. The rotational-speed adaptation can also be carried out by the internal combustion engine VKM in this case. The additional gear Z1 is implemented in that the sixth shift element F as well as the second shift element B are engaged.

In addition to the reverse electrodynamic starting operation (EDA-R), a forward electrodynamic starting operation (EDA-V) can be implemented by adding a sixth shift element F, in that the sixth shift element F is engaged, while the other shift elements A through E remain disengaged. For the rest, reference is made to the comments presented with respect to FIG. 4.

FIGS. 8 through 11 each show a diagrammatic view of a transmission according to one further example variant, wherein, in contrast to the example variant according to FIGS. 5 and 6, a seventh shift element K is provided. The seventh shift element K is arranged and designed in such a way that, in the actuated condition, the seventh shift element K interlocks either the first planetary gear set or the second planetary gear set. The advantage of the seventh shift element K is, among other things, that an additional electric gear E3 can be implemented. The third electric gear E3 corresponds, with respect to a ratio of the third electric gear E3, to the third gear 3, which is a direct gear. If there is purely electric driving in the third gear E3, only the seventh shift element K is engaged, while the other shift elements remain disengaged. In this example embodiment as well, the seventh shift element K is preferably a form-locking shift element, such as a dog clutch.

It is pointed out here that FIGS. 8 through 11 show a transmission with precisely seven shift elements, although it is entirely conceivable to omit the sixth shift element F. A transmission is therefore conceivable that includes the shift elements A, B, C, D, E, and G. This is possible, therefore, since the sixth and seventh shift elements F and K are not in a structural or functional relationship.

Figure 8:
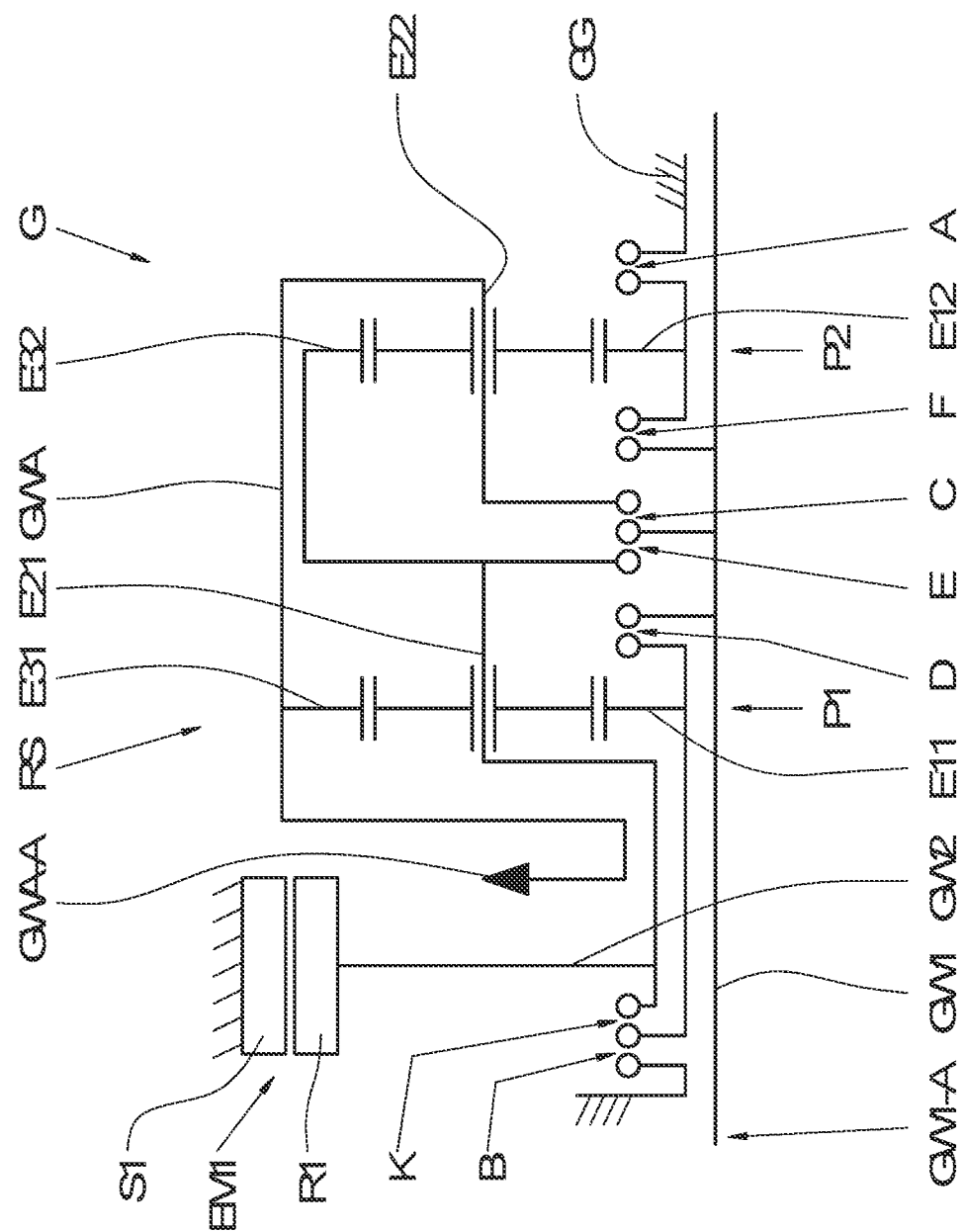
FIGS. 8 through 11 each show a diagrammatic view of a transmission of the type that can also be utilized in the motor vehicle drive train from FIG. 1.

FIG. 8 shows an example embodiment of the transmission, in which the seventh shift element K is arranged in such a way that, in the actuated condition, the seventh shift element K interlocks the first planetary gear set P1. As is readily apparent, the interlock according to FIG. 8 takes place in that the first element E11 of the first planetary gear set and the second element E21 of the first planetary gear set are connected to each other in a rotationally fixed manner. In the interlocked condition of the first planetary gear set P1, the first element E11 as well as the second element E21 are therefore rotationally fixed to the second input shaft GW2. Moreover, the second shift element B and the seventh shift element K are combined to form a first shift element pair SP1. Moreover, the third shift element C and the fifth shift element E are combined to form a second shift element pair SP2. In addition, the first shift element A and the fourth shift element D are combined to form a third shift element pair SP3. The sixth shift element F is designed as a single actuator. For the rest, the example embodiment according to FIG. 8 corresponds to the example embodiment according to FIGS. 2 and 5, and therefore reference is made to the description thereof.

Figure 9:
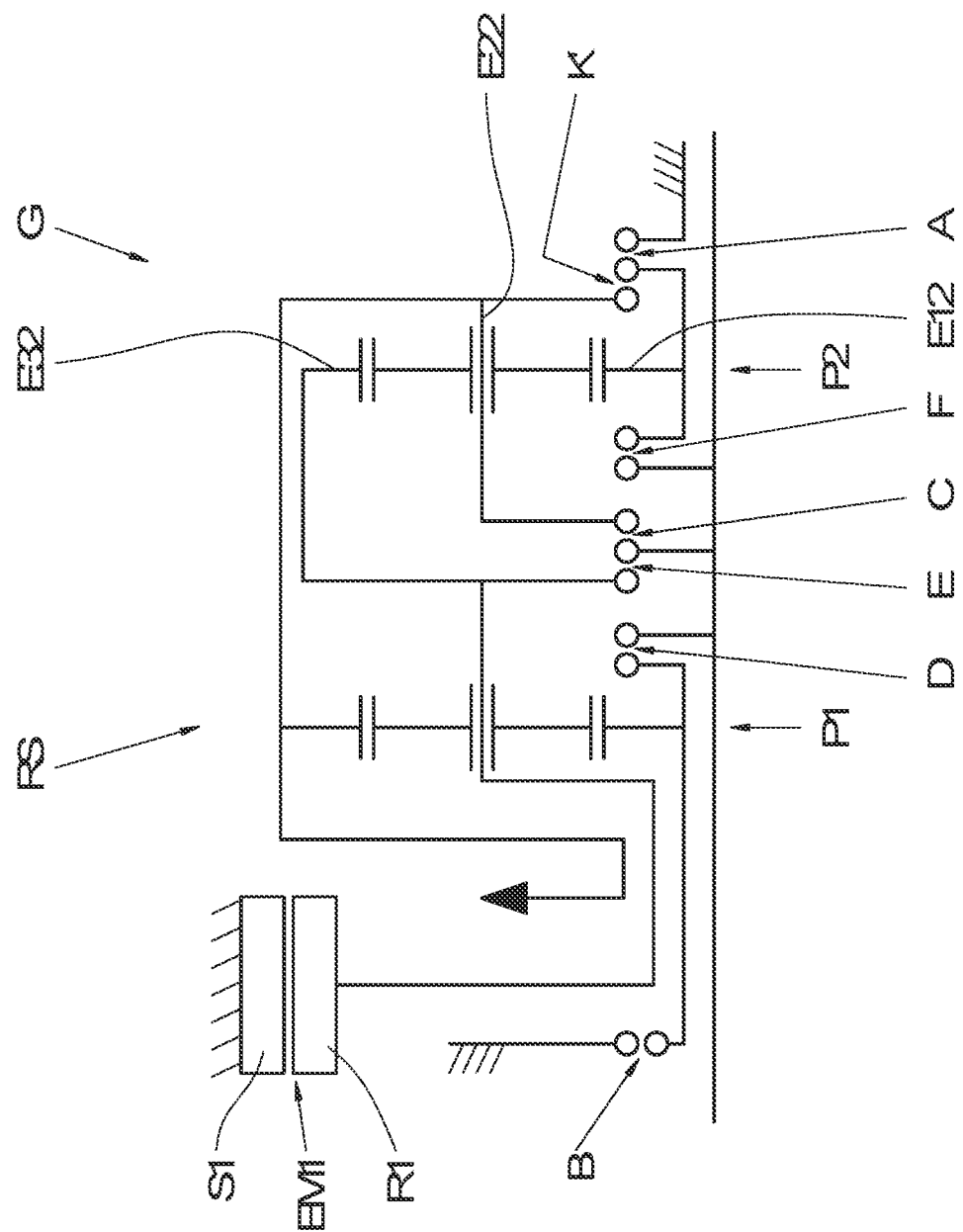

In contrast to FIG. 8, FIG. 9 shows a transmission with a seventh shift element K', wherein the seventh shift element K' is arranged in such a way that, in the actuated condition, the seventh shift element K' interlocks the second planetary gear set P2. The seventh shift element K' then connects the first element E12 of the second planetary gear set and the second element E22 of the second planetary gear set to each other in a rotationally fixed manner. In this condition, the first element E12 and the second element E22 are rotationally fixed to the output shaft GWA. In this exemplary embodiment, the first shift element A and the seventh shift element K' are combined to form a first shift element pair SP1. Moreover, the third shift element C and the fifth shift element E are combined to form a second shift element pair SP2. In addition, the fourth shift element D and the sixth shift element F are combined to form a third shift element pair SP3. In this exemplary embodiment, the second shift element B is designed as a single actuator. For the rest, the example variant according to FIG. 9 corresponds to the example embodiment according to FIG. 8, and therefore reference is made to the description thereof.

Figure 10:
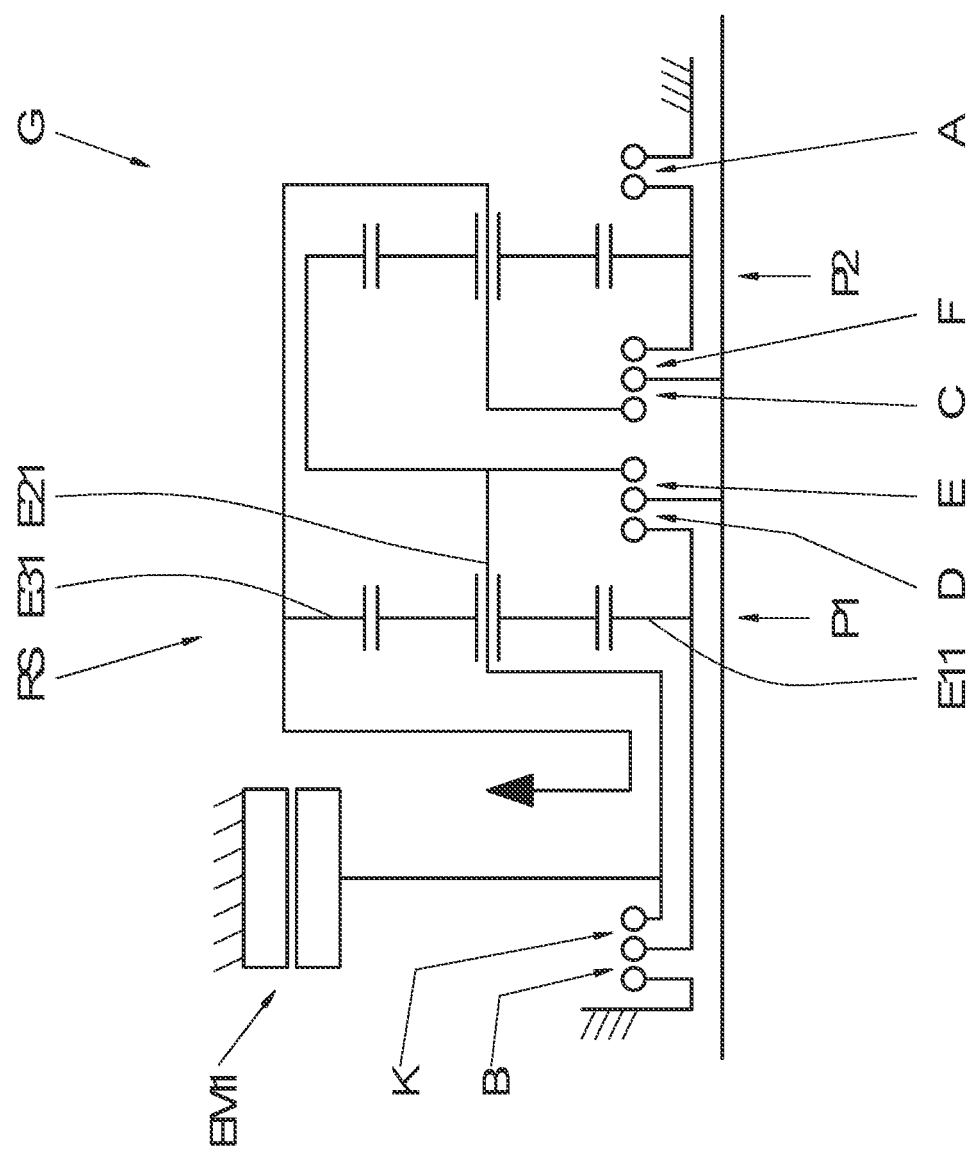

As in FIG. 8, the seventh shift element K in the transmission according to FIG. 10 interlocks the first planetary gear set, in that, in the actuated condition, the seventh shift element K connects the first element E11 and the second element E21 of the first planetary gear set to each other in a rotationally fixed manner. In contrast to FIG. 8, the shift elements are combined differently. In the example embodiment according to FIG. 10, the second shift element B and the seventh shift element K are combined to form a first shift element pair SP1. In addition, the third shift element C and the fourth shift element D are combined to form a second shift element pair SP2. The third shift element pair SP3 is formed by the shift elements E and F. In this exemplary embodiment, the first shift element A is designed as a single actuator. For the rest, the example variant according to FIG. 10 corresponds to the example embodiment according to FIG. 8, and therefore reference is made to the description thereof.

Figure 11:
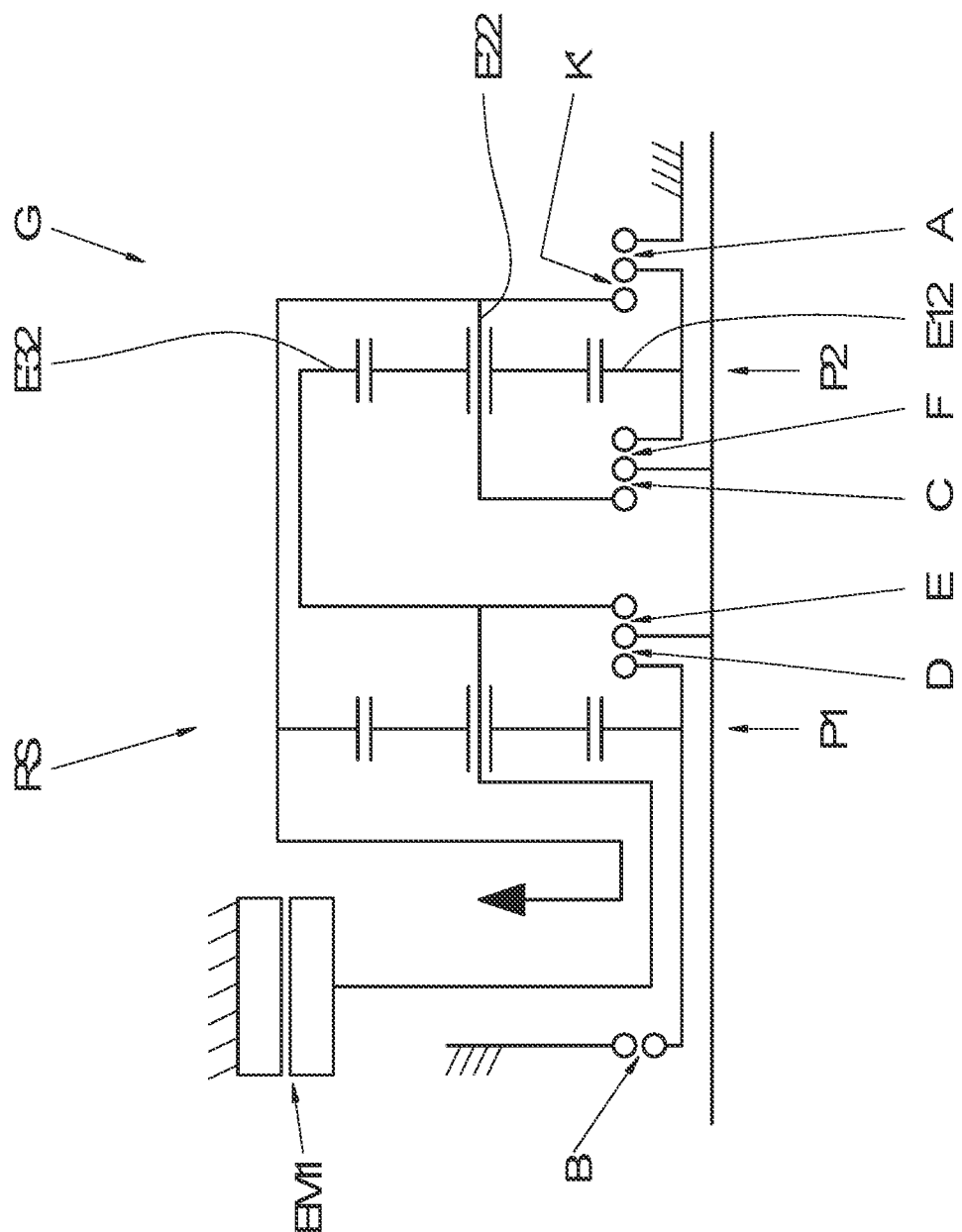

FIG. 11, similarly to FIG. 9, shows a transmission with a seventh shift element K', which is arranged for interlocking, in the actuated condition, the second planetary gear set P2. If the seventh shift element K' is actuated, the first element E12 and the second element E22 of the second planetary gear set are connected to each other in a rotationally fixed manner. In this condition, the first element E12 and the second element E22 are therefore rotationally fixed to the output shaft GWA. In contrast to FIG. 9, the shift elements are combined differently. In this case, the first shift element A and the seventh shift element K' form a first shift element pair SP1. The third shift element C and the fourth shift element D are combined to form a second shift element pair SP2. The fifth shift element E and the sixth shift element F are combined to form a third shift element pair SP3. The second shift element B is designed as a single actuator, as in the embodiment according to FIG. 9. For the rest, the example variant according to FIG. 11 corresponds to the example embodiment according to FIG. 10, and therefore reference is made to the description thereof.

According to the example embodiments according to FIGS. 8 and 10, the first planetary gear set P1 is interlocked, in that the seventh shift element K, in the actuated condition, connects the first element E11 and the second element E21 of the first planetary gear set to each other in a rotationally fixed manner. It is not represented, although conceivable to arrange the seventh shift element K in such a way that the seventh shift element K connects the second element E21 of the first planetary gear set and the third element E31 of the first planetary gear set to each other in a rotationally fixed manner.

The example embodiments according to FIGS. 9 and 11, however, show a transmission with a seventh shift element K', which is arranged in such a way that, in the actuated condition, the seventh shift element K' interlocks the second planetary gear set P2. According to FIGS. 9 and 11, the interlock takes place in that the seventh shift element K', in the actuated condition, connects the first element E12 of the second planetary gear set P2 and the second element E22 of the second planetary gear set P2 to each other in a rotationally fixed manner. Not represented, although conceivable is an arrangement of the seventh shift element K' in such a way that, in the actuated condition, the seventh shift element K' connects the second element E22 of the second planetary gear set and the third element E32 of the second planetary gear set to each other in a rotationally fixed manner.

Figure 12:
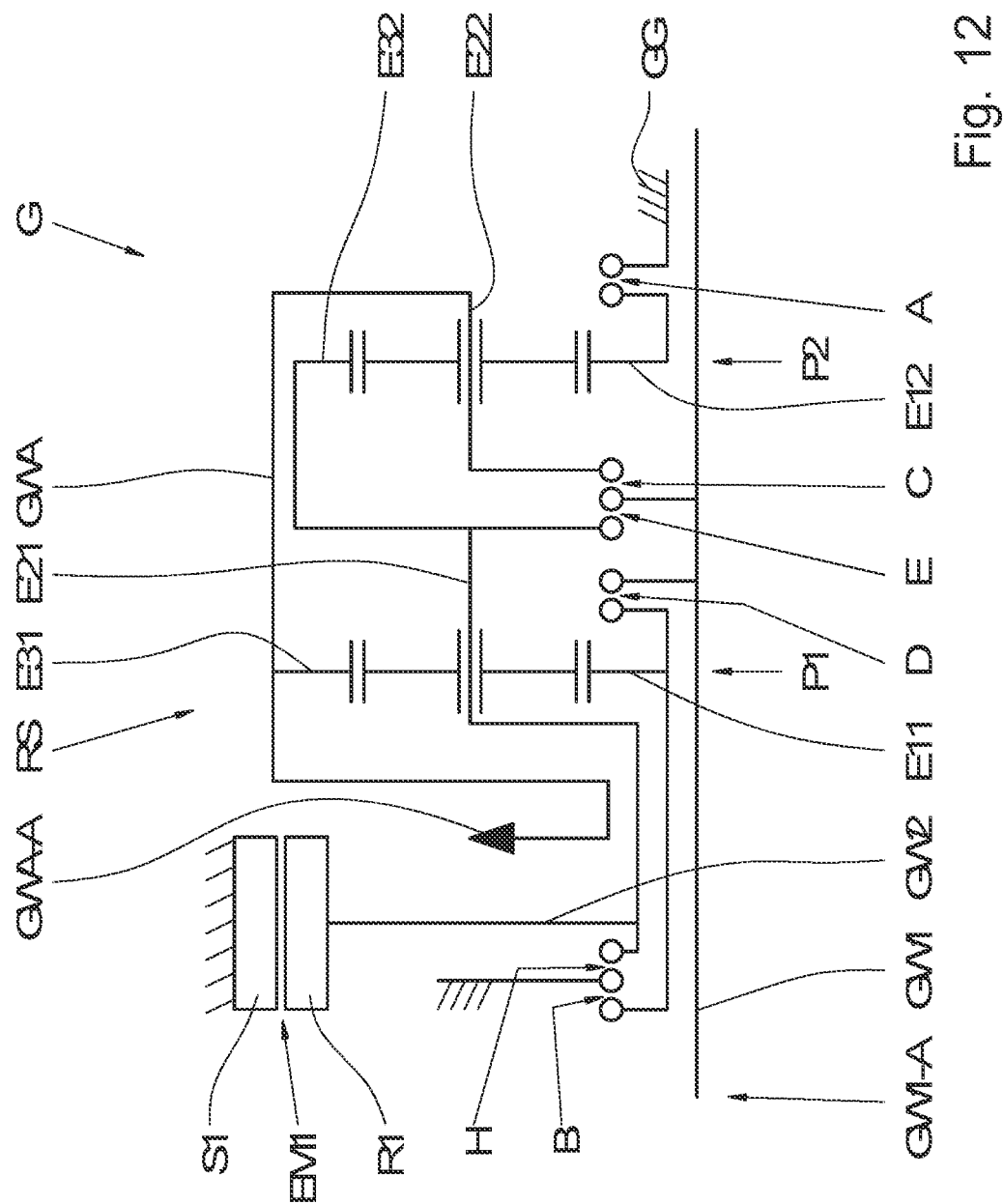
FIGS. 12, 13 each show a diagrammatic view of a transmission of the type that can also be utilized in the motor vehicle drive train from FIG. 1.

FIG. 12 shows a diagrammatic view of a transmission according to one further example variant, wherein, in contrast to the aforementioned example variants, an eighth shift element H is provided. The eighth shift element H is arranged and designed in such a way that, in the actuated condition, the eighth shift element H rotationally fixes the second input shaft GW2 (and, thereby, also the second element E21 and the third element E32) to a rotationally fixed component GG, i.e., fixes the second input shaft GW2 at the rotationally fixed component GG. By providing an eighth shift element of this type, a mechanical reverse gear can be implemented. For this purpose, the shift elements D and H are engaged. The functions of the eighth shift element can be combined with the functions of the sixth shift element and/or of the seventh shift element. The eighth shift element H is also preferably a form-locking shift element, such as a dog clutch. For the rest, the example embodiment according to FIG. 12 corresponds to the example embodiment according to FIG. 2, and therefore reference is made to the description thereof.

Figure 13:
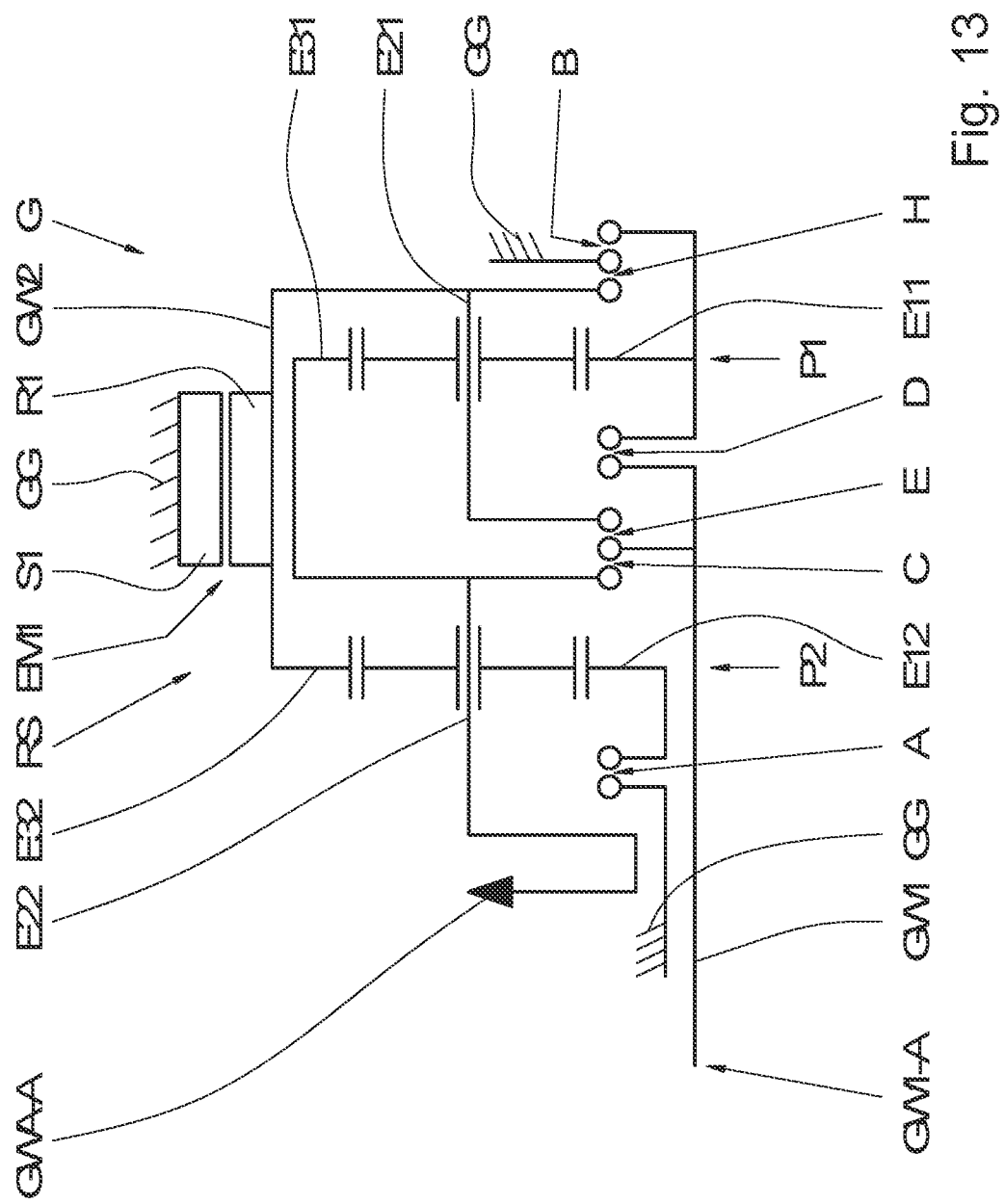

FIG. 13 shows a diagrammatic view of an example further preferred transmission, wherein, in contrast to the transmission according to FIG. 12, the planetary gear sets P1 and P2 have been interchanged. Due to this change, the first electric machine EM1 is not arranged axially adjacent to the two planetary gear sets P1, P2, but rather is located essentially axially at the level of the two planetary gear sets P1 and P2 and radially surrounding the two planetary gear sets P1, P2. For the rest, the example variant according to FIG. 13 corresponds to the example embodiment according to FIG. 12, and therefore reference is made to the description thereof.

Figure 14:
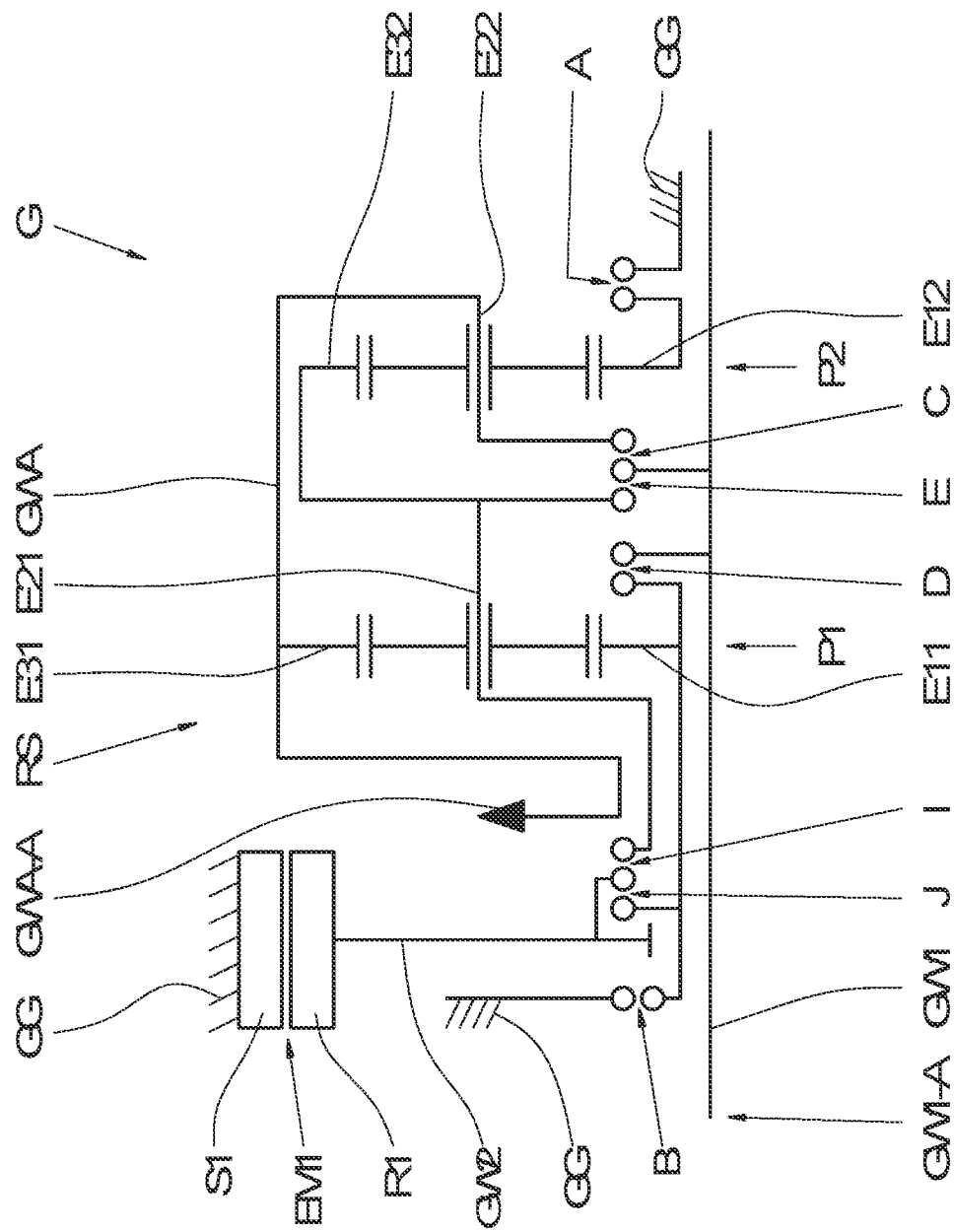
FIGS. 14, 15 each show a diagrammatic view of a transmission of the type that can also be utilized in the motor vehicle drive train from FIG. 1.

FIG. 14 shows a diagrammatic view of an example preferred transmission, wherein, in contrast to the example embodiment according to FIG. 2, a ninth shift element in the form of a double shift element I/J is provided. The double shift element I/J, in a first shift position, connects the rotor R1 (and, thereby, the second input shaft GW2) to the first element E11 of the first planetary gear set P1. However, in a second shift position, the double shift element I/J connects the rotor R1 (and, thereby, the second input shaft GW2) to the second element E21 of the first planetary gear set P1.

According to the example embodiment according to FIG. 14, the rotor R1 and the second element E21 of the first planetary gear set P1 are connected to each other in a rotationally fixed manner when the shift element I of the double shift element I/J is actuated (second shift position). The rotor R1 of the electric machine EM1 is connected to the first element E11 of the first planetary gear set P1, however, when the shift element J of the double shift element I/J is actuated (first shift position).

In a neutral position of the double shift element I/J, the electric machine EM1 is completely decoupled, i.e., the rotor R1 connected to the second input shaft is connected neither to the first element E11 nor to the second element E21. As a result, zero-load losses at the electric machine EM1 can be avoided. Moreover, providing a double shift element I/J has the advantage that one further short electric gear E1 can be implemented with the first shift element A engaged.

A start into the gears 1, 2 and into the first variant 3.1 of the third gear 3 is possible, since the first shift element A also contributes to the gears 1, 2 and the first variant 3.1 of the third gear 3. The short electric gear or e-gear E1 is distinguished by a higher ratio than the electric gear E2. The short electric gear E1 can be selected, in particular, for the case in which particularly high demands are placed on the starting torque. The short electric gear E1 is also advantageous particularly for the case in which driving is to take place on up-hill gradients in a serial operating mode for a longer time, because the first electric machine EM1 does not need to provide as much torque as in the first gear E2 and, therefore, lower heat losses arise at the first electric machine EM1.

The shift elements I and J are also preferably designed as form-locking shift elements, such as a dog clutch. Instead of the double shift element I/J, two single shift elements I and J can also be provided. The advantage of the double shift element is that the double shift element can be actuated with only one actuator.

The functions of the double shift element I/J and of the shift elements I and J can be combined with the functions of the sixth shift element and/or of the seventh shift element and/or of the eighth shift element.

Figure 15:
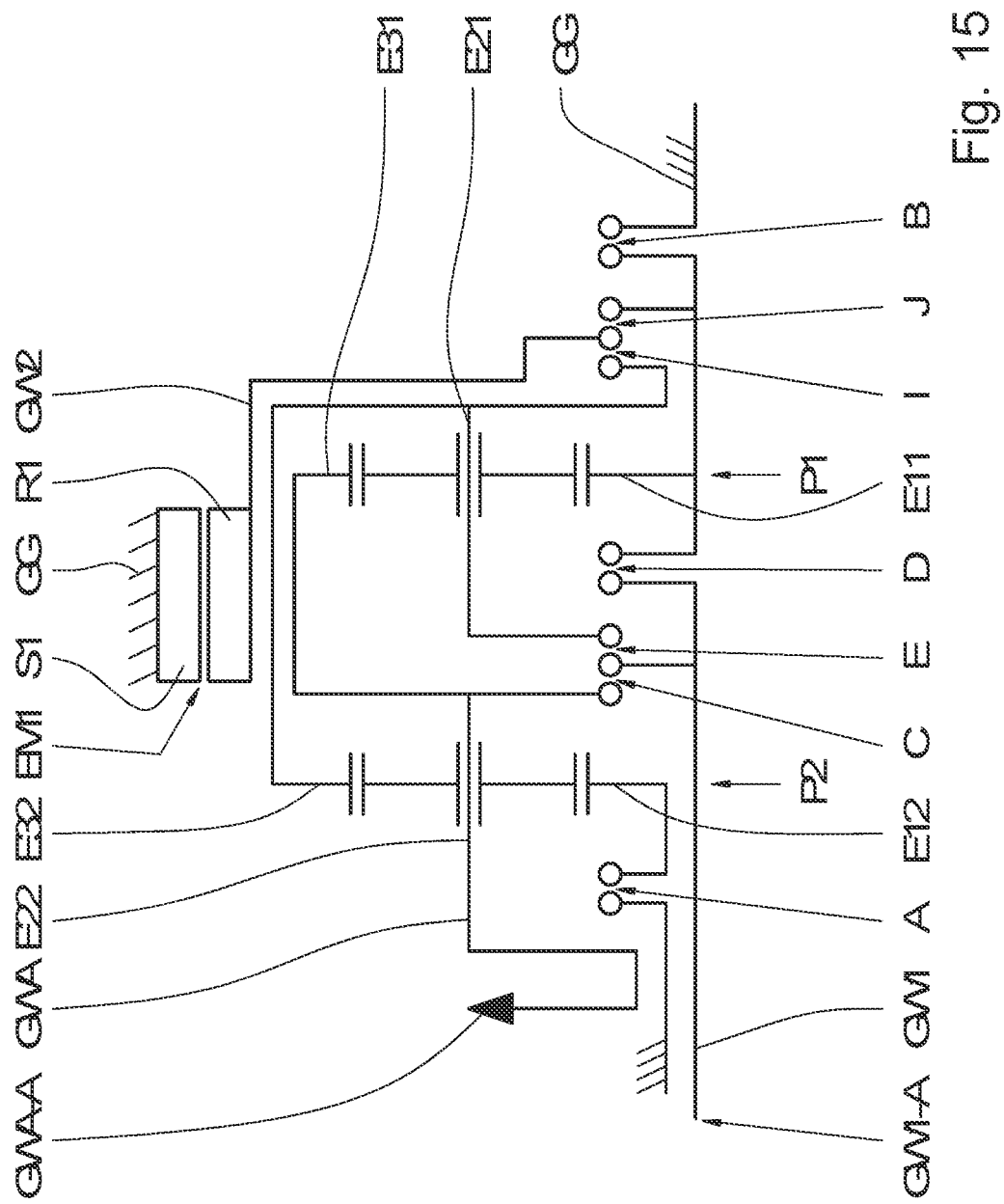

FIG. 15 shows a variant of the example embodiment according to FIG. 14. In contrast to FIG. 14, in the example embodiment according to FIG. 15, the two planetary gear sets P1 and P2 have been interchanged. While retaining the other connections of the elements, the first electric machine EM1 is now no longer axially spaced apart from the two planetary gear sets, but rather is located axially essentially at the level of the two planetary gear sets P1 and P2 and radially surrounding these. For the rest, the example variant according to FIG. 15 corresponds to the example embodiment according to FIG. 14, and therefore reference is made to the description thereof.

Figure 16:
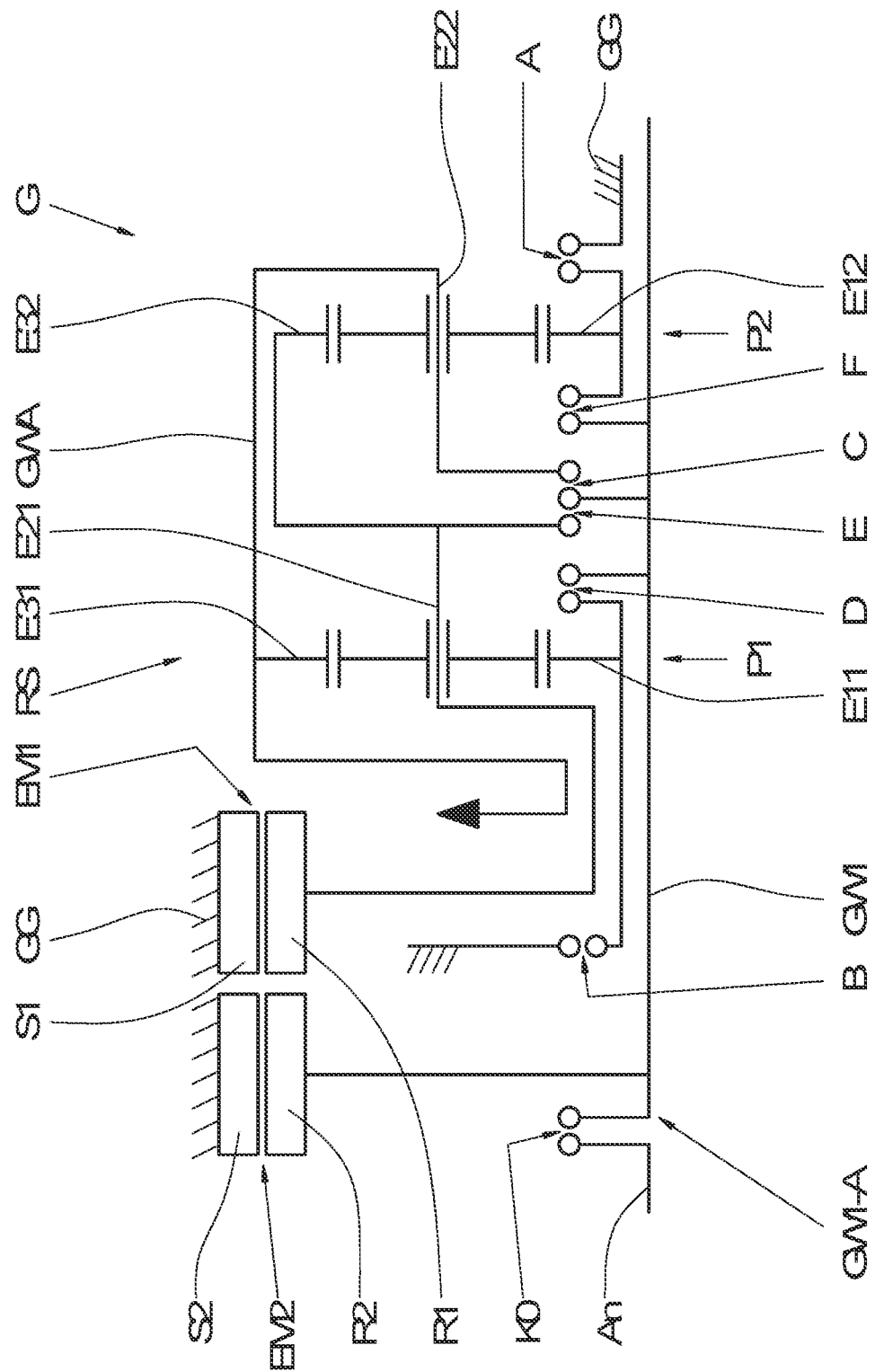
FIG. 16 shows a schematic of a transmission of the type that can be utilized in the motor vehicle drive train from FIG. 1.

FIG. 16 shows a diagrammatic view of a transmission G according to a further example design option of the invention. This example design option can also be utilized in the motor vehicle drive train in FIG. 1, wherein the design option largely corresponds to the example variant from FIG. 2. The difference now, however, is that the first input shaft GW1 can be connected, at the mounting interface GW1-A, via a tenth shift element K0 in a rotationally fixed manner to a connection shaft AN, which is then connected to the upstream internal combustion engine VKM in the motor vehicle drive train. In this case, the tenth shift element K0 is designed as a form-locking shift element and, in this case, preferably as a constant-mesh shift element. In addition, a further electric machine EM2 is also provided, the rotor R2 of which is rotationally fixed to the first input shaft, while a stator S2 of the further electric machine EM2 is fixed at the rotationally fixed component GG. A connection of the rotor R2 of the further electric machine EM2 at the first input shaft GW1 is implemented axially between the tenth shift element K0 and the first planetary gear set P1. Otherwise, the example variant according to FIG. 16 corresponds to the example embodiment according to FIG. 2, and therefore reference is made to the description thereof.

In FIG. 17, different conditions of the motor vehicle drive train from FIG. 1, with utilization of the transmission G from FIG. 16, are represented in table form, wherein these different conditions are achieved via different integrations of the two electric machines EM1 and EM2 and the internal combustion engine VKM. The upper table shows various shift conditions with engagement of only one of the two electric machines, wherein the launch clutch K0 is disengaged. The lower table shows a plurality of further shift conditions, which result from the use of the two electric machines EM1 and EM2, wherein the launch clutch K0 is disengaged.

First, purely electric driving by a single electric machine and disengaged shift element K0 is described.

In the gear E2, purely electric driving takes place via the electric machine EM1, in that the first gear E2 is implemented in the transmission G in the way described above with respect to FIG. 4. In the gear E4, purely electric driving also takes place via the electric machine EM1, in that the second gear E4 is implemented in the transmission G in the way described above with respect to FIG. 4. In the third gear E3, purely electric driving takes place via the electric machine EM2, in that the third gear E3 is implemented in the transmission G by actuating the third shift element C.

In these conditions, driving can take place in a particularly effective manner, since, in the case of a low load request, driving takes place with only one of the two electric machines EM1, EM2.

Second, purely electric driving by both electric machines and disengaged shift element K0 is described.

As becomes apparent from the table, the same gear steps can be implemented as described in FIG. 4, wherein these can now be driven purely electrically.

Starting at the gear E1, driving then takes place via the electric machine EM1 and via the second electric machine EM2, in that both electric machines EM1 and EM2 are jointly integrated via the selection of the appropriate gears in the transmission G. A first gear E1 is selected by engaging the shift elements A and D. A second gear E2 is selected by engaging the shift elements A and E. A third gear in a first variant E3.1 is selected by engaging the shift elements A and C. A second variant E3.2 of the third gear is selected by engaging the shift elements B and C. A third variant E3.3 of the third gear is selected by engaging the shift elements C and D. By engaging the shift elements C and E, a fourth variant E3.4 of the third gear is selected. A sixth variant E3.5 of the third gear is selected by engaging the shift elements C and F. A seventh variant E3.6 of the third gear is selected by engaging the shift elements E and F. An eighth variant E3.7 of the third gear is selected by engaging the shift elements D and F. A fifth variant E3.8 is selected by engaging the shift elements D and E. A fourth gear E4 is selected by engaging the shift elements B and E. The additional forward gear EZ1 is selected by engaging the shift elements B and F.

The advantages of two electric machines can be summarized as follows:
  purely electric powershift, since the second electric machine EM2, with disengaged shift element K0, performs the functions of the internal combustion engine VKM;
  the second electric machine EM2, with disengaged shift element K0, can be utilized for synchronization, while the first electric machine EM1 supports the tractive force;
  a greater total electrical power is implementable with disengaged shift element K0
  a greater range is possible in a hybrid operation;
  the internal combustion engine VKM can be started by the second electric machine EM2;
  the second electric machine EM2 can synchronize the shift element K0;
  a battery-independent serial operation is possible; and
  the second electric machine EM2 can be used as a generator, the first electric machine EM1 can be used as a motor.

By providing the second electric machine EM2 on the input shaft GW1, different electrical additional functions also result. In a purely electric EDA mode, an electric gear shift EDS is possible, wherein the represented launch clutch K0 is disengaged here, while, however, the sixth shift element F is engaged, i.e., the electric gears of the electric machine EM1 are power shiftable with one another. This has the advantage that the first electric machine EM1 also contributes the largest portion of the drive power during the gear shift and the second electric machine EM2 can be dimensioned considerably smaller than the first electric machine EM1. For example, the power of the second electric machine EM2 can be approximately one-third the power of the first electric machine EM1.

In addition, a purely electric EDA starting operation is possible, wherein, in this case as well, the launch clutch K0 is disengaged, while the sixth shift element F is engaged. It is advantageous that the vehicle with a transmission of this type can also be driven for a longer time with high torque and very low ground speeds without the electric machine or the inverter overheating, since both electric machines EM1, EM2 can be operated at suitable rotational speeds. As a result, an operation at very low electric-machine rotational speeds is avoided.

With the clutch K0 engaged, the same shift conditions are implementable during hybrid travel and during internal combustion engine-driven travel, as explained with respect to FIGS. 4 and 7, and so reference is made to the descriptions thereof.

The electric machines EM1 and EM2 can be positioned either coaxially to the gear set as well as axially parallel to the input shaft. The electric machines EM1, EM2 can be connected to the particular transmission shaft directly or via further gear stages, such as a planetary gear set or a spur gear stage. An additional gear stage can be useful, therefore, in order to obtain a more favorable design of the particular electric machine. In this way, for example, a higher rotational speed and a lower torque can be achieved.

Finally, FIGS. 18 through 23 show modifications of the example transmissions G from FIGS. 2, 3, 5, 6, 8 through 15, and 16. These modifications relate to alternative possibilities for integrating the electric machine EM1, although the example modifications can also be utilized, in a similar way, for the further electric machine EM2 in the transmission G according to FIG. 16.

Figure 18:
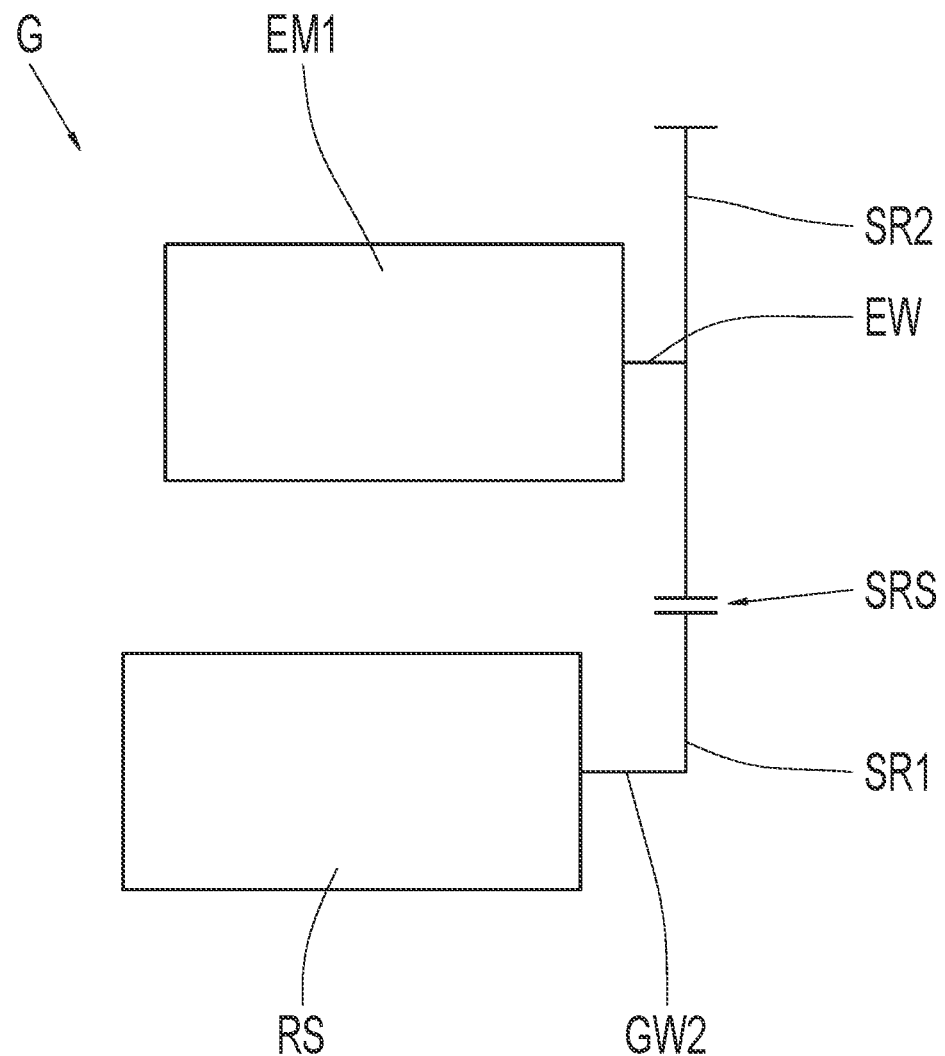

In FIG. 18, for example, the electric machine EM1 is not located coaxially to the particular gear set RS (not represented in greater detail here) of the transmission G, but rather is arranged axially offset with respect thereto. A connection takes place via a spur gear stage SRS, which is composed of a first spur gear SR1 and a second spur gear SR2. The first spur gear SR1 is connected at the second input shaft GW2 in a rotationally fixed manner on the side of the particular gear set RS. The spur gear SR1 then meshes with the spur gear SR2, which is located on an input shaft EW of the electric machine EM1 in a rotationally fixed manner. Within the electric machine EM1, the input shaft EW establishes the connection at the rotor (not represented further in this case) of the electric machine EM1.

Figure 19:
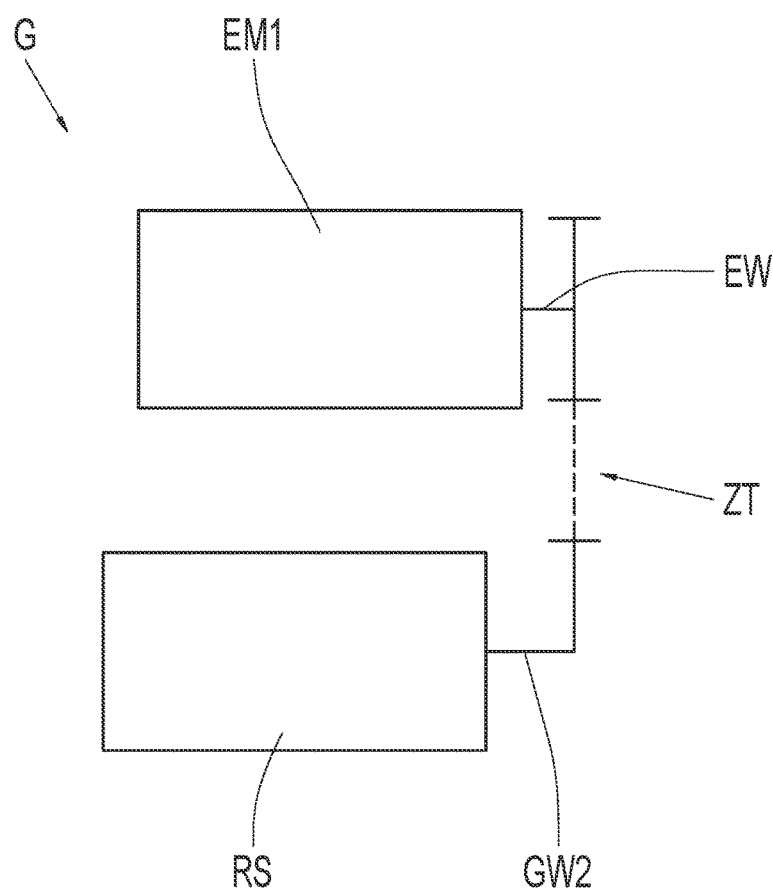

In the case of the example modification according to FIG. 19 as well, the electric machine EM1 is located axially offset with respect to the particular gear set RS of the particular transmission G. In contrast to the preceding example variant according to FIG. 18, a connection is not established in this case via a spur gear stage SRS, however, but rather via a flexible traction drive mechanism ZT. This flexible traction drive mechanism ZT can be configured as a belt drive or also a chain drive. The flexible traction drive mechanism ZT is then connected at the second input shaft GW2 on the side of the particular gear set RS. Via the flexible traction drive mechanism ZT, a coupling to an input shaft EW of the electric machine EM1 is then established. Within the electric machine EM1, the input shaft EW establishes a connection at the rotor of the electric machine.

Figure 20:
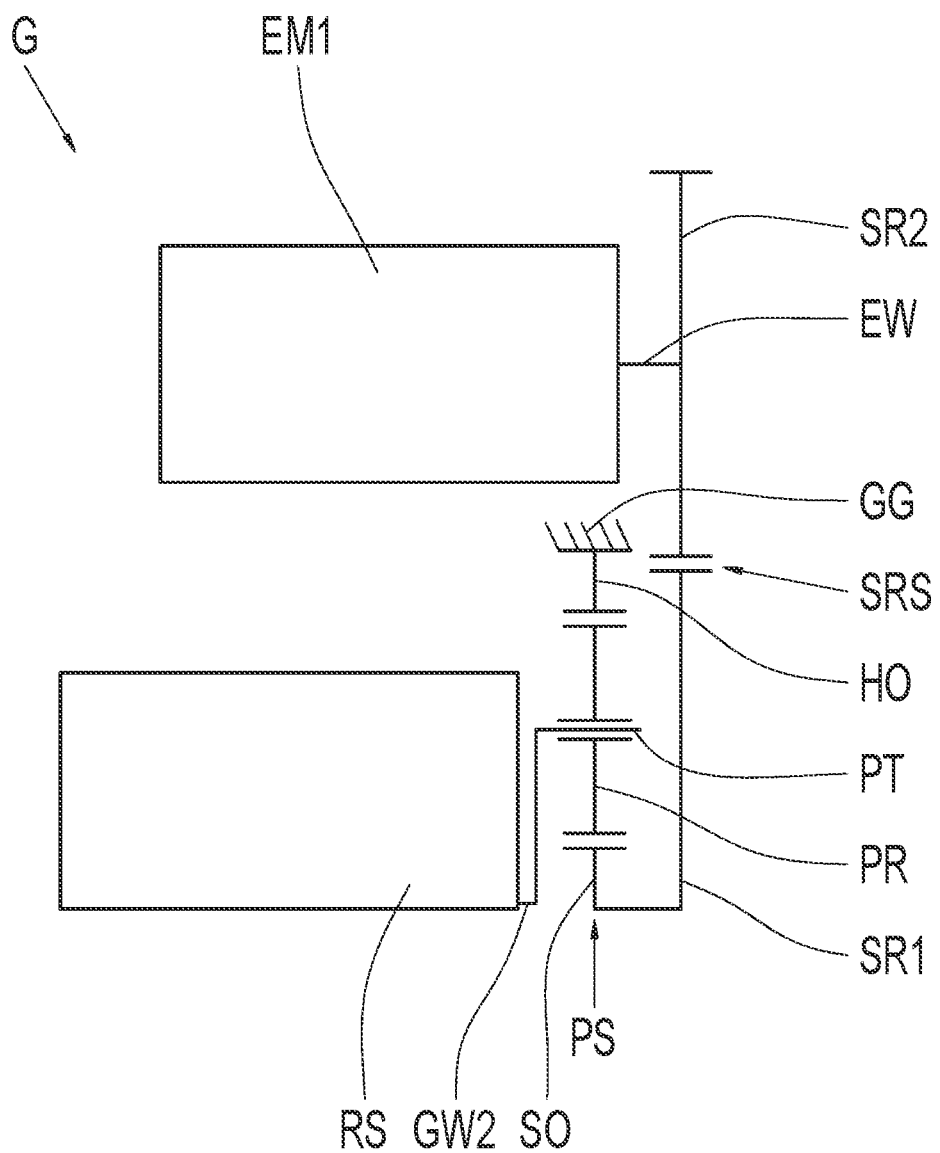

In the case of the example modification according to FIG. 20, an integration of the electric machine EM1, which is located axially offset with respect to the particular gear set RS, is implemented via a planetary gear stage PS and a spur gear stage SRS. The planetary gear stage PS is connected downstream from the gear set RS, wherein, on the output end of the planetary gear stage PS, the spur gear stage SRS is then provided, via which the connection to the electric machine EM1 is established. The planetary gear stage PS includes a ring gear HO, a planet carrier PT, and a sun gear SO, wherein the planet carrier PT guides, in a rotatably mounted manner, at least one planet gear PR, which is meshed with the sun gear SO as well as with the ring gear HO.

In the present case, the planet carrier PT is connected at the second input shaft GW2 in a rotationally fixed manner on the side of the gear set RS from FIGS. 2, 3, 5, 6, 8 through 15, and FIG. 16. By comparison, the ring gear HO is permanently fixed at the rotationally fixed component GG, while the sun gear SO is rotationally fixed to a first spur gear SR1 of the spur gear stage SRS. The first spur gear SR1 then intermeshes with a second spur gear SR2 of the spur gear stage SRS, which is provided, in a rotationally fixed manner, on an input shaft EW of the electric machine EM1. In this case, the electric machine EM1 is therefore connected by the gear set RS via two gear stages.

Figure 21:
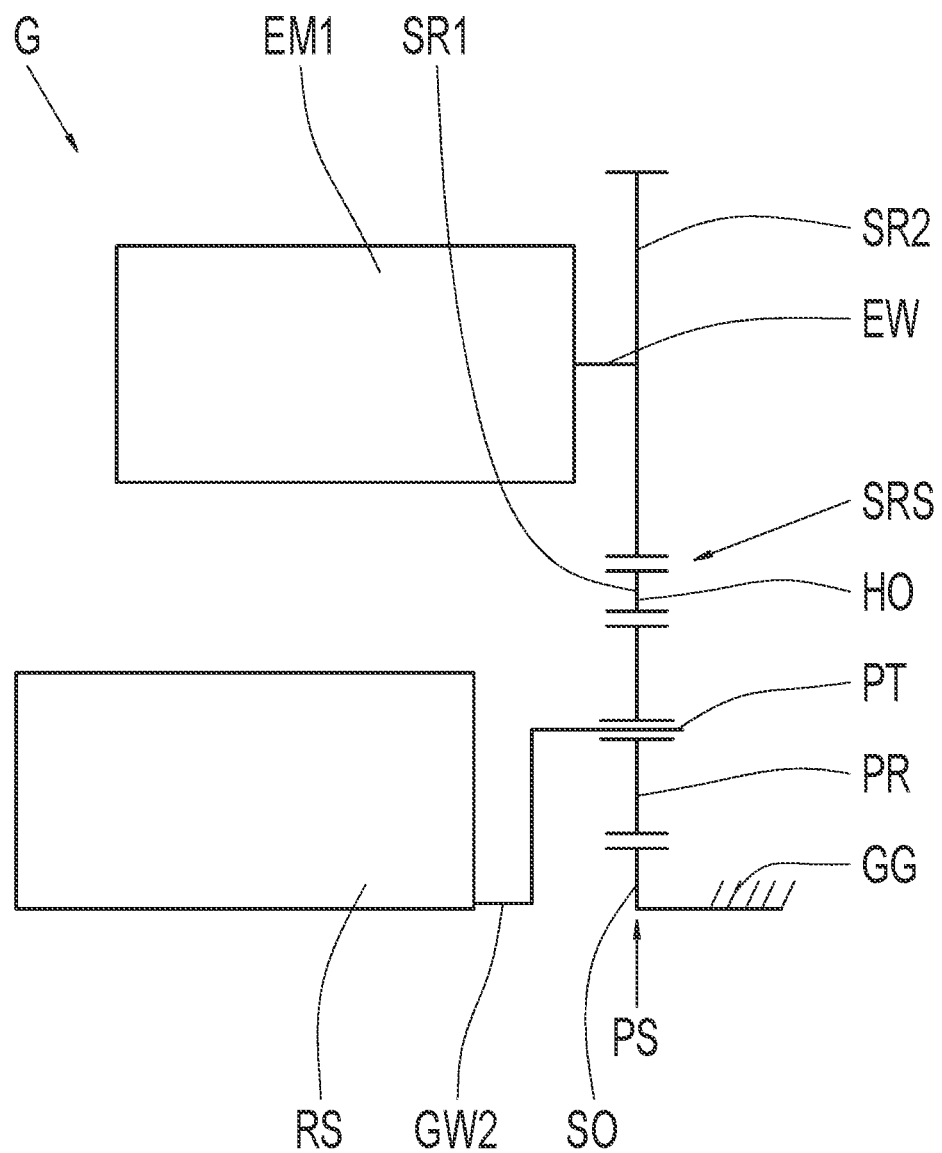

In the case of the example modification from FIG. 21 as well, an integration of the electric machine EM1 is implemented by the gear set RS via a planetary gear stage PS and a spur gear stage SRS. The modification largely corresponds to the example variant according to FIG. 20, with the difference that, with respect to the planetary gear stage PS, the sun gear SO is now fixed at the rotationally fixed component GG, while the ring gear HO is rotationally fixed to the first spur gear SR1 of the spur gear stage SRS. Specifically, the ring gear HO and the first spur gear SR1 are preferably designed as one piece, in that the ring gear HO is equipped, at an outer circumference, with a tooth system. For the rest, the example modification according to FIG. 21 corresponds to the example variant according to FIG. 20, and therefore reference is made to the description thereof.

Figure 22:
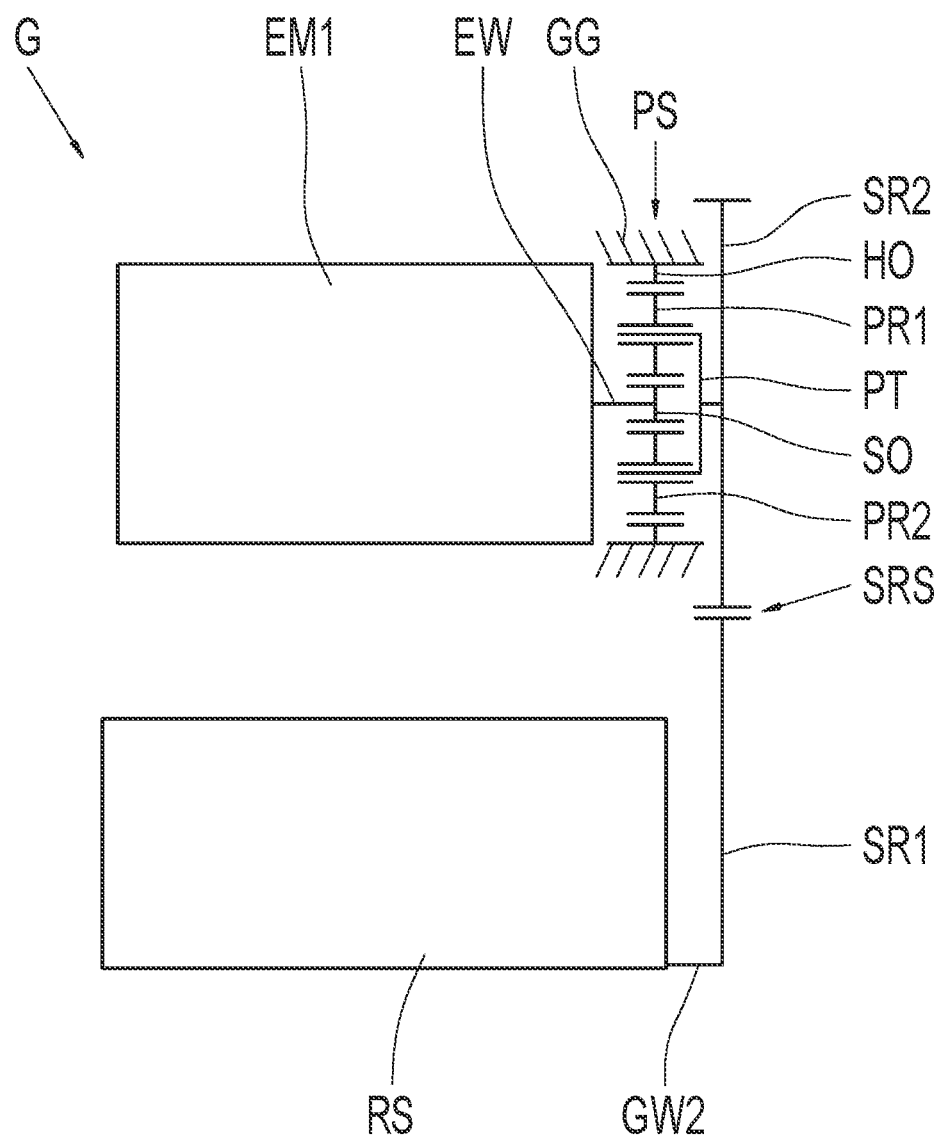

Moreover, FIG. 22 shows one further example modification of the transmissions G from FIGS. 2, 3, 5, 6, 8 through 15, and FIG. 16, wherein, in this case as well, an integration of the electric machine EM1 is implemented via a spur gear stage SRS and a planetary gear stage PS. In contrast to the preceding example variant according to FIG. 21, the gear set RS is initially followed here by the spur gear stage SRS, while the planetary gear stage PS is provided in the power flow between the spur gear stage SRS and the electric machine EM1. The planetary gear stage PS also includes, once again, the elements ring gear HO, planet carrier PT, and sun gear SO, wherein the planet carrier PT guides, in a rotatably mounted manner, multiple planet gears PR1 and PR2, each of which is meshed with the sun gear SO as well as with the ring gear HO.

As is apparent in FIG. 22, a first spur gear SR1 of the spur gear stage SRS is connected in a rotationally fixed manner on the side of the gear stage RS of the transmissions G from FIGS. 2, 3, 5, 6, 8 through 15, and FIG. 16, wherein this connection is implemented at the second input shaft GW2. The first spur gear SR1 then intermeshes with a second spur gear SR2 of the spur gear stage SRS, which is rotationally fixed to the planet carrier PT of the planetary gear stage PS. The ring gear HO is permanently fixed at the rotationally fixed component GG, while the sun gear SO is provided, in a rotationally fixed manner, on an input shaft EW of the electric machine EM1.

Figure 23:
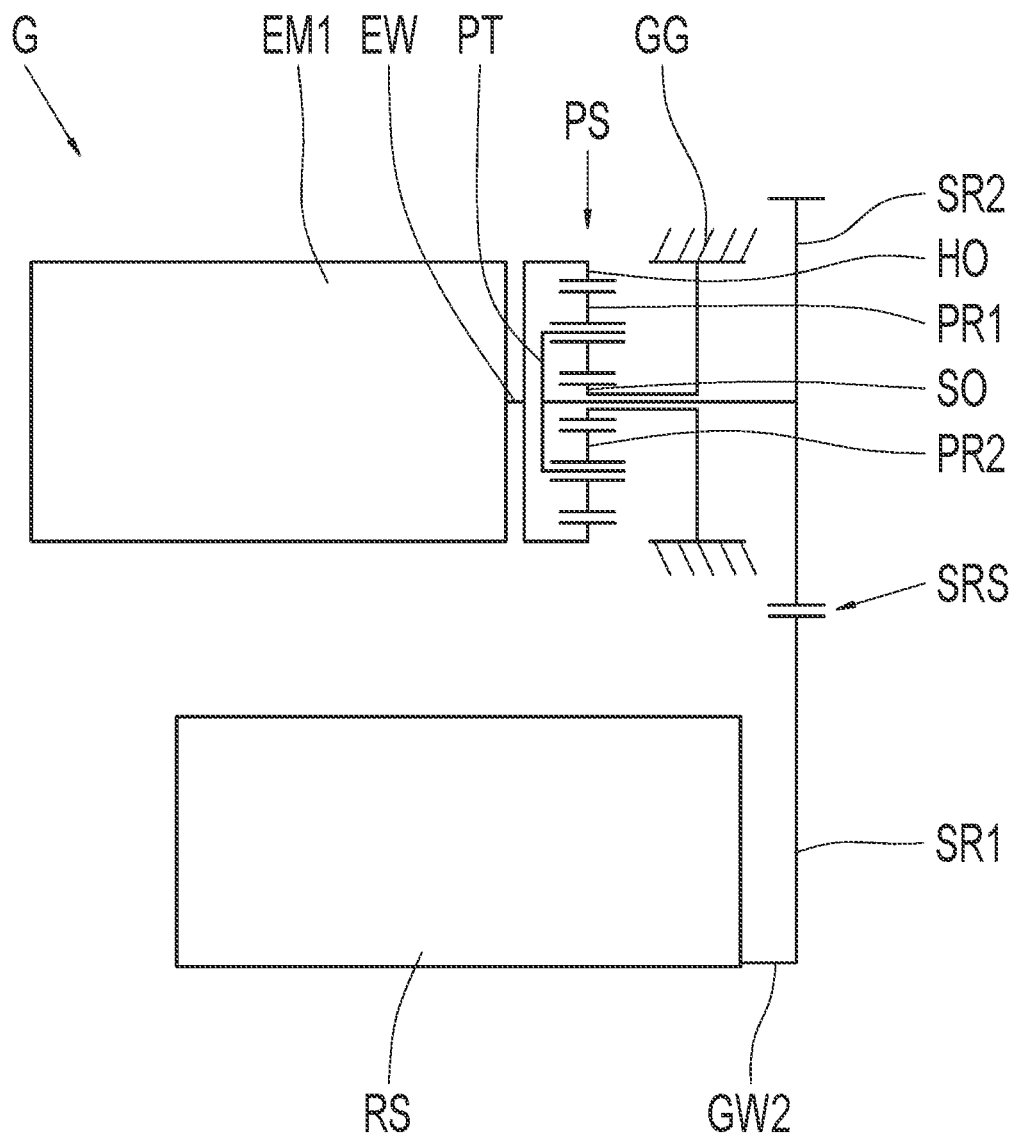

Finally, FIG. 23 shows one further example modification of the transmissions G from FIGS. 2, 3, 5, 6, 8 through 15, and FIG. 16, wherein this example modification essentially corresponds to the preceding example variant according to FIG. 22. The only difference is that the sun gear SO of the planetary gear stage PS is now permanently fixed at the rotationally fixed component GG, while the ring gear HO of the planetary gear stage PS is rotationally fixed to the input shaft EW of the electric machine EM1. For the rest, the example modification according to FIG. 23 corresponds to the example variant according to FIG. 22, and therefore reference is made to the description thereof.

Figure 24:
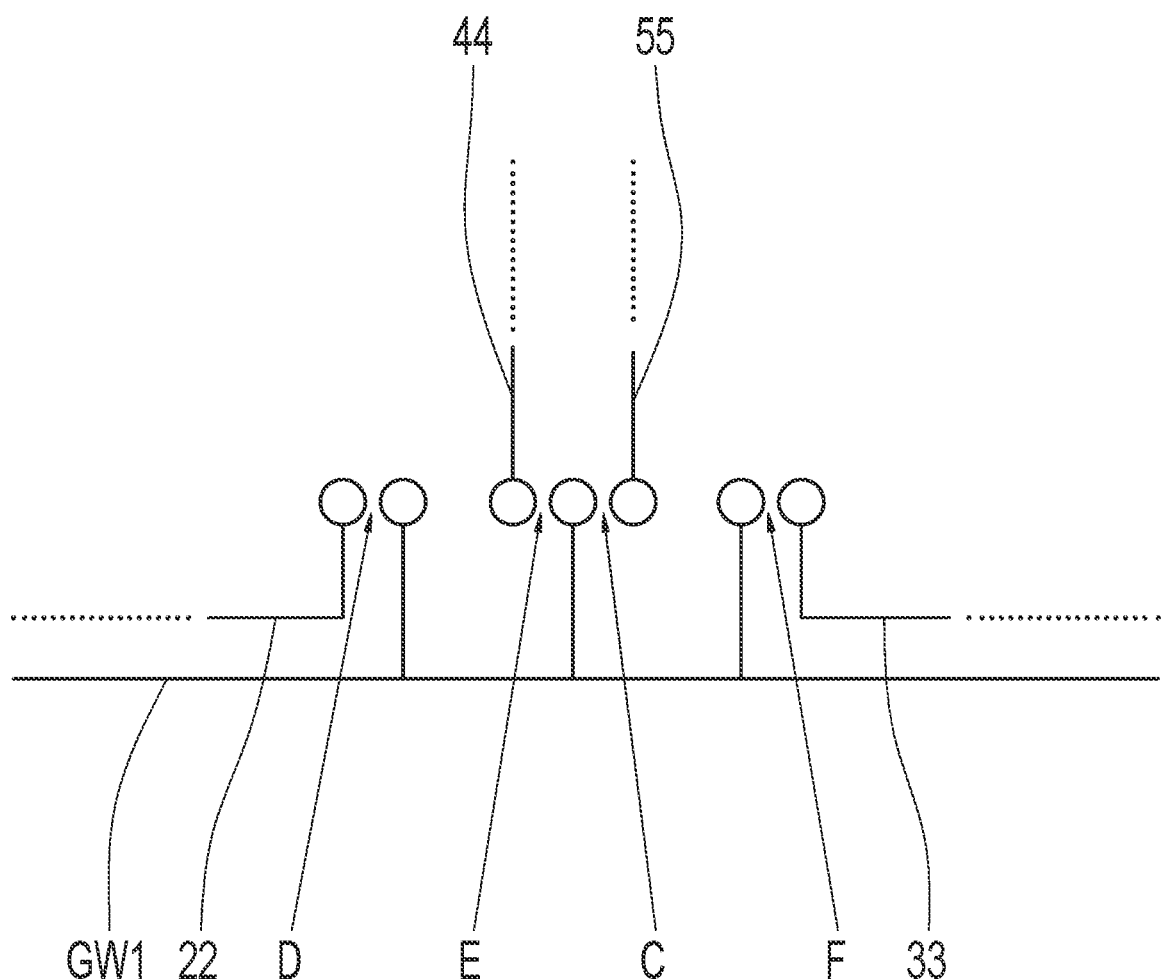
FIG. 24 shows a section of the transmissions from FIGS. 4 and 9.

FIG. 24 shows a section of the four inner shift elements, namely the third shift element C, the fourth shift element D, the fifth shift element E, and the sixth shift element F from the transmission according to FIGS. 5, 6, and 8 through 11 in a simplified diagrammatic view. As is readily apparent, the four shift elements C, D, E, and F are associated with the same shaft, namely the first input shaft GW1, wherein the two "outer" shift elements D and F are spatially separated by the shift elements E and C. The manner in which four shift elements of this type can be actuated, by way of example, by only two actuators is the object of FIGS. 25 through 30.

FIGS. 25 through 30 each show a schematic of an actuating unit 10 of the type which can be utilized, for example, for actuating the aforementioned four shift elements C, D, E, and F. The shift elements can be actuated from the "inside" out, i.e., from the inside of the input shaft GW1. The four shift elements C, D, E, and F are actuated by two actuating elements designed as control rods S1, S2, which, in turn, are each actuated by an actuator A1, A2, respectively. The actuation of the shift elements C, D, E, and F takes place from within the input shaft, i.e., from the inside. The shift elements C, D, E, and F are constant-mesh shift elements.

Figure 25:
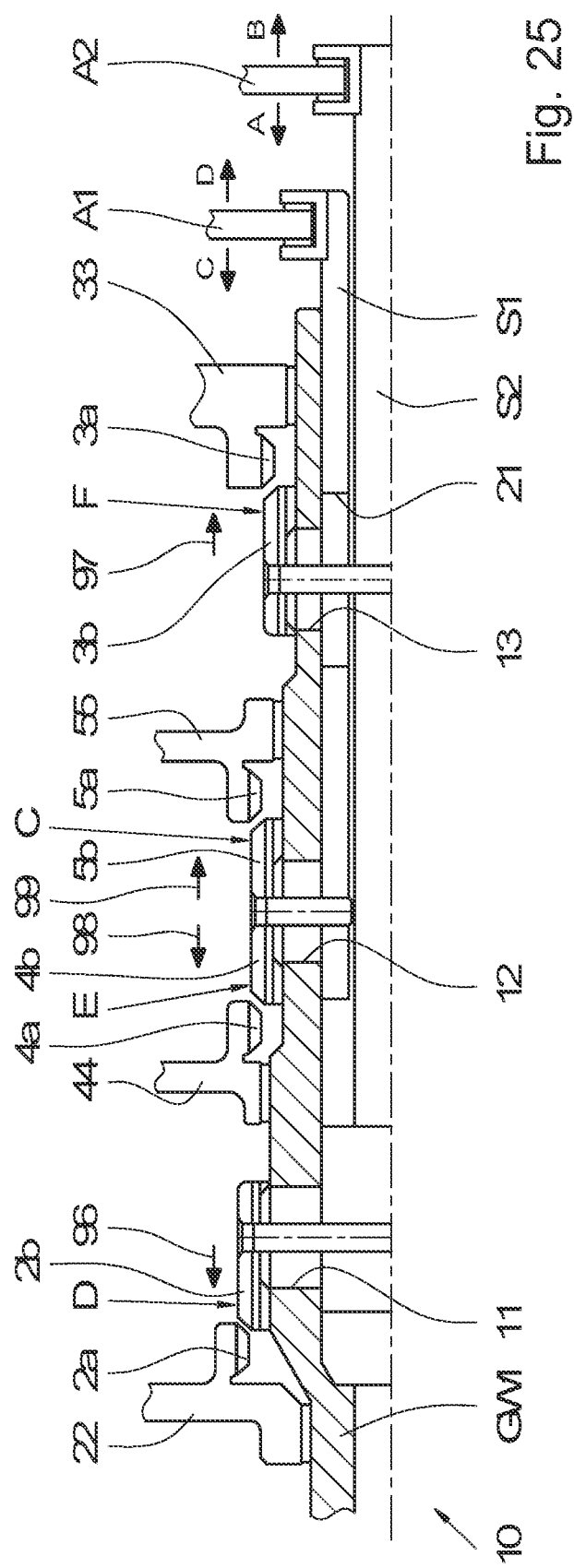
FIGS. 25 through 30 show an exemplary actuating unit for a transmission.

With respect to FIG. 25: The input shaft GW1 of the transmission G is designed as a hollow shaft in this case. A first control rod S1 is also designed as a hollow shaft, whereas a second control rod S2 is designed as a solid shaft. Both control rods S1, S2 are guided within the input shaft GW1, wherein the second control rod S2 is guided within the first control rod S1. As viewed radially from the outside, the sequence results: input shaft GW1, first control rod S1, second control rod S2. The first control rod S1 can be actuated by a first actuator A1, whereas the second control rod S2 can be actuated by a second actuator A2.

The actuators A1, A2 are arranged on a side of the sixth shift element F facing away from the third shift element C.

In the actuated, i.e., engaged condition, the shift elements D, E, C, and F rotationally fix the input shaft GW1 to another shaft in each case. In this way, the fourth shift element D connects the input shaft GW1 to a second shaft 22,
the fifth shift element E connects the input shaft GW1 to a third shaft 33,
the third shift element C connects the input shaft GW1 to a fourth shaft 44, and
the sixth shift element F connects the input shaft GW1 to a fifth shaft 55.

The shaft 22 can form at least a portion of the first element E21 of the first planetary gear set P1 or be connected thereto. The shaft 44 can form at least a portion of the third element E31 of the first planetary gear set P1 or be connected thereto. The shaft 55 can form at least a portion of the second element E22 of the second planetary gear set P2 or be connected thereto. The shaft 33 can form at least a portion of the first element E12 of the second planetary gear set P2 or be connected thereto.

For the form-fitting connections, the shafts 22, 33, 44, and 55 include tooth systems 2a, 3a, 4a, and 5a, respectively, which correspond to tooth systems 2b, 3b, 4b, and 5b, respectively, of the dogs. The mode of operation of dog clutches is known from the prior art, and so it will not be discussed in greater detail here.

Each control rod S1, S2 can actuate precisely two shift elements. As is to be easily derived from FIG. 15, the first control rod S1 actuates the third shift element C and the fifth shift element E, which are designed as a double shift element in the present case. The second control rod S2, however, actuates the shift elements D and F, which are spatially separated from one another.

In order to actuate the fifth shift element E, the first actuator A1, starting from a non-actuated condition, moves the first gear change rod S1 in the arrow direction 98, i.e., toward the left in the viewing direction. In order to actuate the third shift element C, the first actuator A1, starting from a non-actuated condition, moves the first gear change rod S1 in the arrow direction 99, i.e., toward the right in the viewing direction.

In order to actuate the fourth shift element D, the second actuator A2, starting from a non-actuated condition, moves the second gear change rod S2 in the arrow direction 96, i.e., toward the left in the viewing direction. In order to actuate the sixth shift element F, the second actuator A2, starting from a non-actuated condition, moves the second gear change rod S2 in the arrow direction 97, i.e., toward the right in the viewing direction.

In order to ensure that the shift elements can be actuated from within the input shaft GW1, the input shaft GW1 includes three recesses, namely a first recess 11, a second recess 12, and a third recess 13. In addition, the first control rod S1 includes a recess 21. The recesses are oblong holes in the present case.

A mechanical coupling or connection of the shift element D with the second control rod S2 takes place through the first oblong hole 11 of the input shaft GW1. A mechanical coupling of the shift elements E, C with the first control rod S1 takes place through the second oblong hole 12 of the input shaft GW1. Due to the design as a double shift element, the mechanical connection of two shift elements is possible through only one oblong hole. The mechanical coupling of the shift element F, however, takes place through the two mutually corresponding, i.e., essentially aligned oblong holes 13, 21 of the input shaft GW1 and the first control rod S1, respectively.

The particular shift element D, E, C, and F is rotationally fixed to the control rod S1, S2 via a section (not described in greater detail), which is guided through the particular oblong hole 11, 12, 13, and 21.

The shift elements D and F, on the one hand, and E and C, on the other hand, are collectively controlled. This means, when the shift element D is engaged, the shift element F is simultaneously disengaged, and vice versa. The same also applies for the shift elements E and C.

In order to ensure that the one control rod does not inadvertently move the other control rod and, thereby, possibly engage or disengage a shift element, the oblong hole 21 of the first control rod S1 has a larger diameter than the third oblong hole 13 of the input shaft GW1. In the present case, the diameter is twice as great. As is also apparent, the two control rods are aligned with respect to one another in such a way that the two oblong holes 13, 21 are aligned with one another when the shift elements are each in a non-actuated condition.

By the actuating unit 10, the two shift elements D, F arranged on the outside can be actuated by only one gear change rod and by only one actuator. Therefore, only two actuators A1, A2 are necessary for the four shift elements C, D, E, and F.

Figure 26:
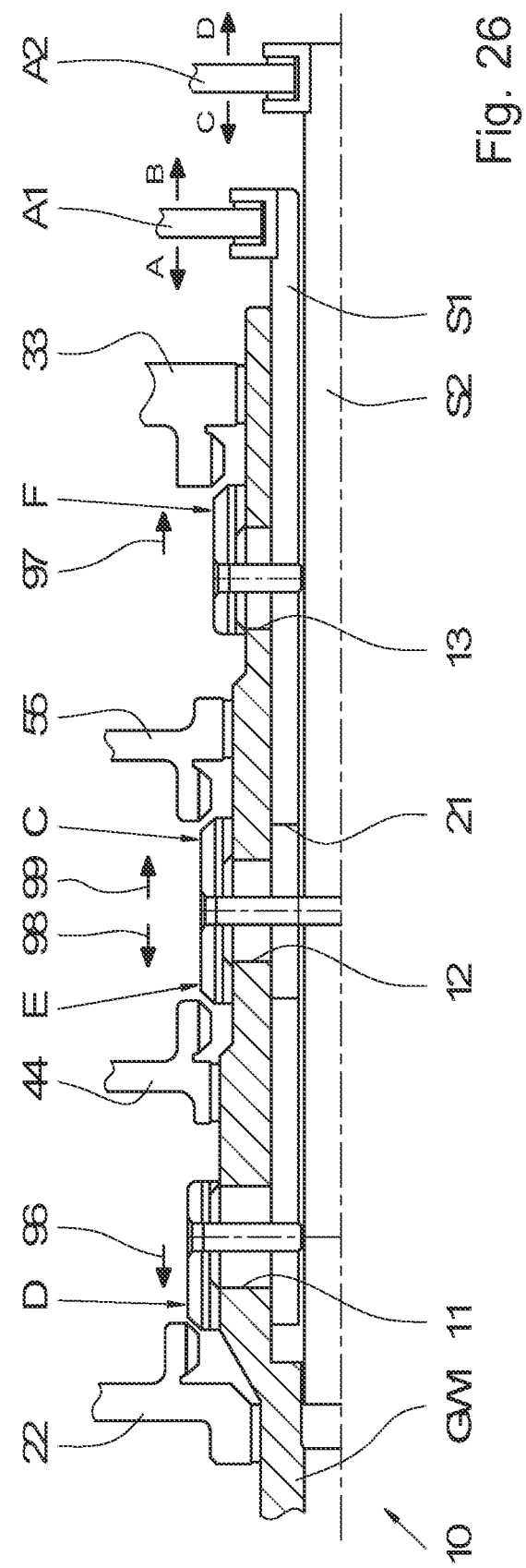

FIG. 26 shows a schematic of the actuating unit 10 in a second example embodiment. In contrast to the example embodiment according to FIG. 25, the first control rod S1 actuates the two shift elements D and F. The shift elements C and E are actuated by the second control rod S2, however. For this purpose, the oblong hole 21 is arranged in the first control rod S1 in such a way that the oblong hole 21 corresponds to the second oblong hole 12 of the input shaft GW1. The oblong holes 11, 12, 13 remain unchanged.

In order to actuate the shift element E, the second actuator A2, starting from a non-actuated condition, therefore moves the second gear change rod S2 in the arrow direction 98, i.e., toward the left in the viewing direction. In order to actuate the shift element C, the second actuator A2, starting from a non-actuated condition, moves the second gear change rod S2 in the arrow direction 99, i.e., toward the right in the viewing direction.

In order to actuate the shift element D, the first actuator A1, starting from a non-actuated condition, moves the first gear change rod S1 in the arrow direction 96, i.e., toward the left in the viewing direction. In order to actuate the shift element F, the first actuator A1, starting from a non-actuated condition, moves the first gear change rod S1 in the arrow direction 97, i.e., toward the right in the viewing direction. For the rest, the example variant according to FIG. 26 corresponds to the example embodiment according to FIG. 25, and therefore reference is made to the description thereof.

Figure 27:
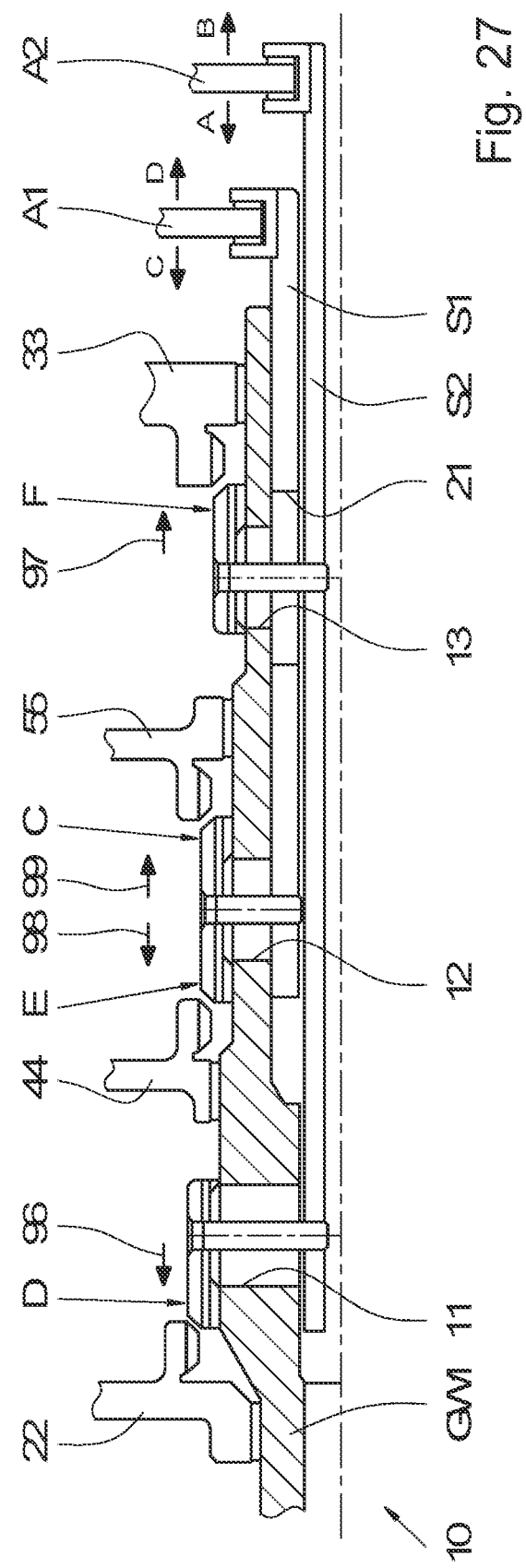

FIG. 27 shows a schematic of the actuating unit 10 in a third example embodiment. In contrast to the example embodiment according to FIG. 26, the second control rod S2 is designed as a hollow shaft. This allows for a lighter weight and offers space for an oil lubrication (not represented in the present case). For the rest, the example variant according to FIG. 27 corresponds to the example embodiment according to FIG. 25, and therefore reference is made to the description thereof.

Figure 28:
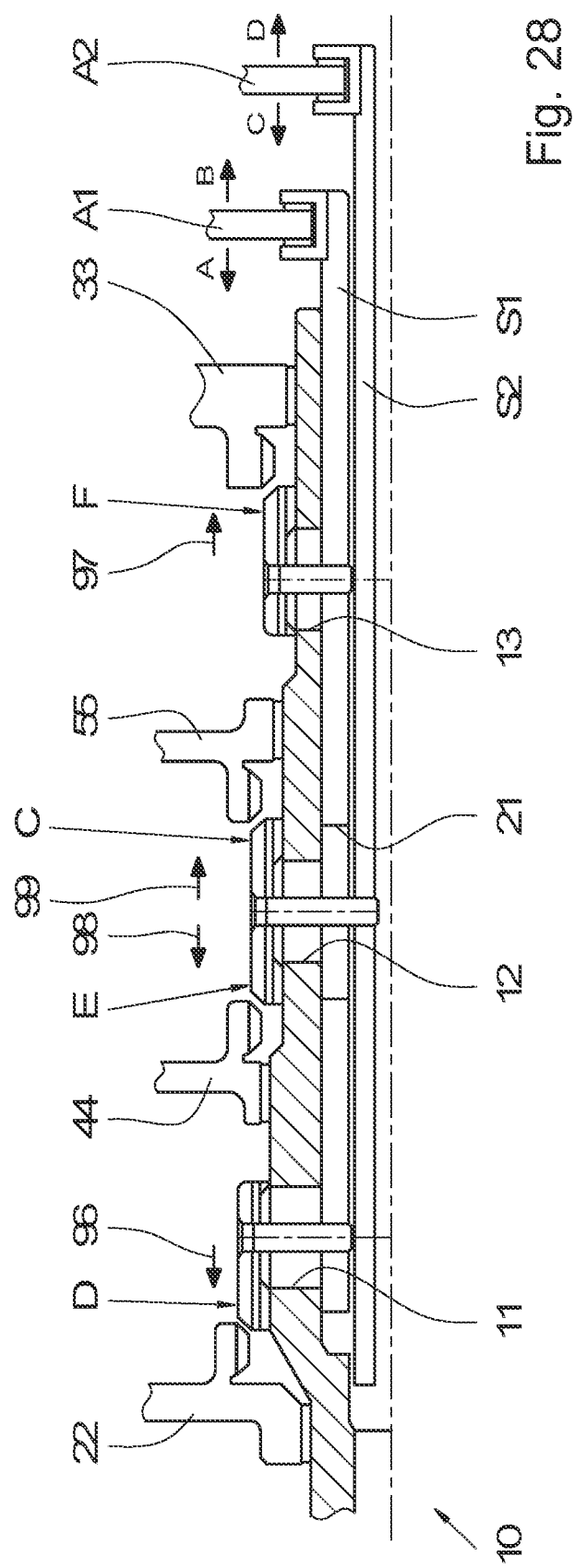

FIG. 28 shows a schematic of the actuating unit 10 in one further example embodiment. In contrast to the example embodiment according to FIG. 25, the first control rod S1 actuates the two shift elements D and F. The shift elements C and E are actuated by the second control rod S2, however. This corresponds to the example embodiment according to FIG. 26. In addition, the second control rod S2 is designed as a hollow shaft, cf., the example embodiment according to FIG. 27. In other words, this is a combination of the example embodiments according to FIGS. 26 and 27. For the rest, the example variant according to FIG. 28 corresponds to the example embodiments according to FIGS. 26 and 25, and therefore reference is made to the description thereof.

Figure 29:
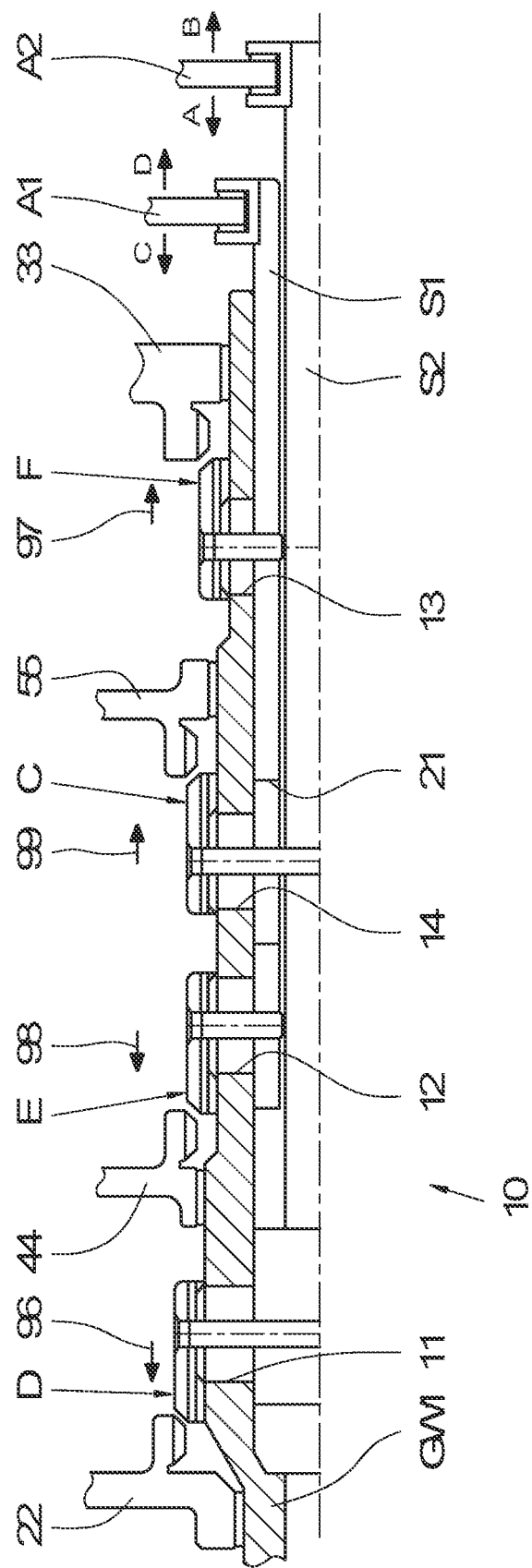

FIG. 29 shows a schematic of the actuating unit 10 in one further example embodiment. In contrast to the example embodiment according to FIG. 25, the shift elements C and E are each designed as a single shift element. This makes a fourth oblong hole 14 in the input shaft GW1 necessary. The fourth oblong hole 14 is arranged axially between the second oblong hole 12 and the third oblong hole 13.

In contrast to the example embodiment according to FIG. 25, the fourth oblong hole 14 of the input shaft GW1 now corresponds to the oblong hole 21 of the first control rod S1.

The first control rod S1 actuates the fifth shift element E and the sixth shift element F, whereas the second control rod S2 actuates the shift elements C and D.

The mechanical connection of the third shift element C to the second control rod S2 takes place through a section (not described in greater detail) through the two oblong holes 14 and 21.

In this way, four spatially separated shift elements, namely D and C, on the one hand, and E and F, on the other hand, can be actuated by precisely two actuators A1, A2. For the rest, the example variant according to FIG. 29 corresponds to the example embodiment according to FIG. 25, and therefore reference is made to the description thereof.

Figure 30:
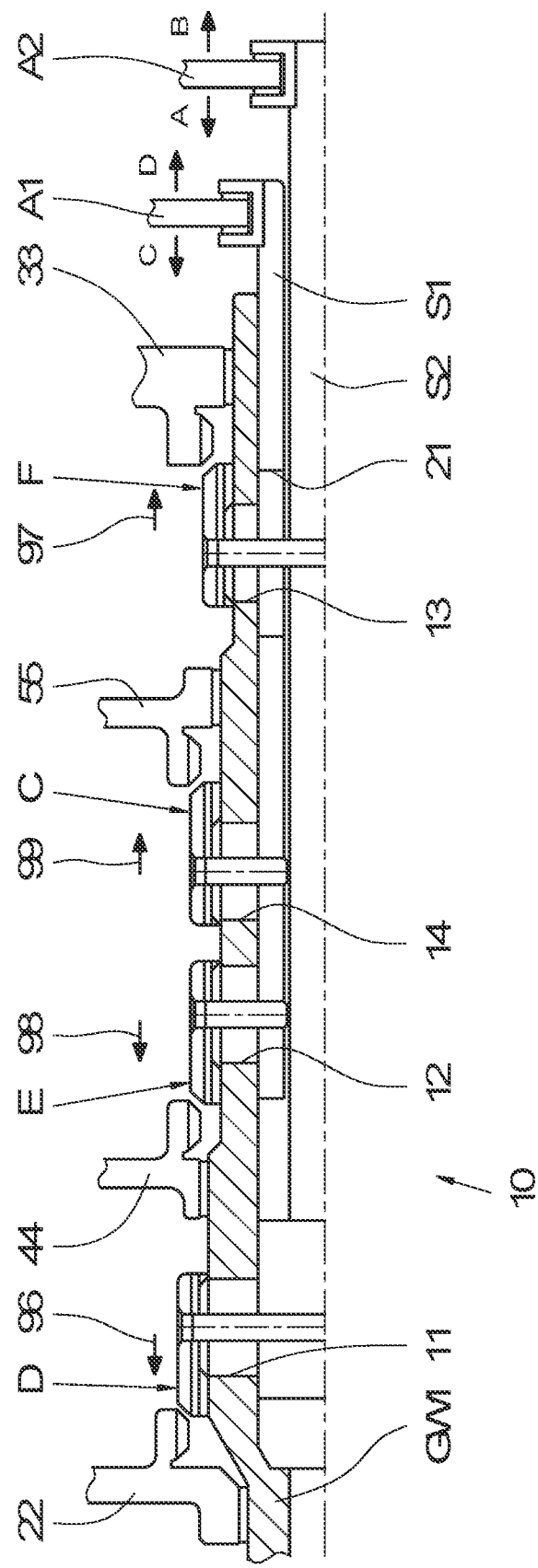

FIG. 30 shows a schematic of the actuating unit 10 in one further example embodiment. In contrast to the example embodiment according to FIG. 25, the shift elements E and C are each designed as a single shift element. This makes a fourth oblong hole 14 in the input shaft GW1 necessary. The fourth oblong hole 14 is arranged axially between the second oblong hole 12 and the third oblong hole 13. As in FIG. 25, the oblong hole 21 of the first control rod S1 corresponds to the third oblong hole 13 of the input shaft GW1.

As in the example embodiment according to FIG. 25, the first control rod S1 actuates the shift elements E and C, whereas the second control rod S2 actuates the shift elements D and F. For the rest, the example variant according to FIG. 30 corresponds to the example embodiment according to FIG. 25, and therefore reference is made to the description thereof.

Using example embodiments of the invention, a transmission having a compact design and good efficiency can be implemented.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

G transmission
RS gear set
GG rotationally fixed component
P1 first planetary gear set
E11 first element of the first planetary gear set
E21 second element of the first planetary gear set
E31 third element of the first planetary gear set
P2 second planetary gear set
E12 first element of the second planetary gear set
E22 second element of the second planetary gear set
E32 third element of the second planetary gear set
A first shift element B second shift element
C third shift element
D fourth shift element
E fifth shift element
F sixth shift element
K seventh shift element
H eighth shift element
I/J ninth shift element
K0 tenth shift element
SP1 shift element pair
SP2 shift element pair
SP3 shift element pair
1 first gear
2 second gear
3.1 third gear
3.2 third gear
3.3 third gear
3.4 third gear
3.5 third gear
3.6 third gear
3.7 third gear
3.8 third gear
4 fourth gear
E2 first gear
E4 second gear
E3 third gear
V3 third gear
Z1 additional gear
EDA-V forward electrodynamic travel
EDA-R reverse electrodynamic travel
GW1 first input shaft
GW1-A mounting interface
GW2 second input shaft
GWA output shaft
GWA-A mounting interface
AN connection shaft
EM1 electric machine
S1 stator
R1 rotor
EM2 electric machine
S2 stator
R2 rotor
SRS spur gear stage
SR1 spur gear
SR2 spur gear
PS planetary gear stage
HO ring gear
PT planet carrier
PR planet gear
PR1 planet gear
PR2 planet gear
SO sun gear
ZT flexible traction drive mechanism
VKM internal combustion engine
TS torsional vibration damper
AG differential gear
DW driving wheels
22 shaft
33 shaft
44 shaft
55 shaft
11 recess, oblong hole, bore hole
12 recess, oblong hole, bore hole
13 recess, oblong hole, bore hole
14 recess, oblong hole, bore hole
21 recess, oblong hole, bore hole
96 direction
97 direction
98 direction
99 direction
A1 actuator
A2 actuator
S1 actuating element, control rod
S2 actuating element, control rod

The invention claimed is:

1. A transmission (G) for a motor vehicle, comprising:
an electric machine (EM1);
a first input shaft (GW1);
a second input shaft (GW2);
an output shaft (GWA);
a first planetary gear set (P1) and a second planetary gear set (P2), the first and second planetary gear sets (P1, P2) each comprising a first element (E11, E12), a second element (E21, E22), and a third element (E31, E32); and
a first shift element (A), a second shift element (B), a third shift element (C), a fourth shift element (D), and a fifth shift element (E),
wherein a rotor (R1) of the electric machine (EM1) is connected to the second input shaft (GW2),
wherein the first element (E12) of the second planetary gear set (P2) is fixable to a rotationally fixed component (GG) with the first shift element (A),
wherein the first element (E11) of the first planetary gear set (P1) is fixable to the rotationally fixed component (GG) with the second shift element (B),
wherein the first input shaft (GW1) is connectable to the output shaft (GWA) with the third shift element (C),
wherein the first input shaft (GW1) is connectable to the first element (E11) of the first planetary gear set (P1) with the fourth shift element (D),
wherein the first input shaft (GW1) is connectable to the second input shaft (GW2) with the fifth shift element (E),
wherein the output shaft (GWA) is rotationally fixed to the third element (E31) of the first planetary gear set (P1) as well as to the second element (E22) of the second planetary gear set (P2), and
wherein the second input shaft (GW2) is rotationally fixed to the second element (E21) of the first planetary gear set (P1) as well as to the third element (E32) of the second planetary gear set (P2).

2. The transmission of claim 1, wherein precisely four gears are implementable between the first input shaft (GW1) and the output shaft (GWA) by selectively actuating the first, second, third, fourth, and fifth shift elements (A, B, C, D, E).

3. The transmission of claim 2, wherein selective actuation of the first, second, third, fourth, and fifth shift elements (A, B, C, D, E) implements:
a first gear (1) between the first input shaft (GW1) and the output shaft (GWA) by engaging the first shift element (A) and the fourth shift element (D);
a second gear between the first input shaft (GW1) and the output shaft (GWA) by engaging the first shift element (A) and the fifth shift element (E);
a third gear (3) between the first input shaft (GW1) and the output shaft (GWA)
in a first variant (3.1) by engaging the first shift element (A) and the third shift element (C),
in a first variant (3.2) by engaging the second shift element (B) and the third shift element (C),
in a third variant (3.3) by engaging the third shift element (C) and the fourth shift element (D), in a fourth variant (3.4) by engaging the third shift element (C) and the fifth shift element (E), and in a fifth variant (3.8) by engaging the fourth shift element (D) and the fifth shift element (E);

a fourth gear (4) between the first input shaft (GW1) and the output shaft (GWA) by engaging the second shift element (B) and the fifth shift element (E).

4. The transmission of claim 2, wherein, between the second input shaft (GW2) and the output shaft (GWA):

a first gear (E2) results by engaging the first shift element (A); and a second gear (E4) results by engaging the second shift element (B).

5. The transmission of claim 1, wherein a reverse electrodynamic starting mode (EDA-R) for travel results by engaging the fourth shift element (D).

6. The transmission of claim 1, further comprising an additional electric machine (EM2), a rotor (R2) of the additional electric machine (EM2) connected to the first input shaft (GW1).

7. The transmission of claim 1, further comprising a sixth shift element (F), the first input shaft (GW1) connectable to the first element (E12) of the second planetary gear set (P2) with the sixth shift element (F).

8. The transmission of claim 7, wherein, by selectively actuating the first, second, third, fourth, fifth, and sixth shift elements (A, B, C, D, E, F), a third gear (3) results between the first input shaft (GW1) and the output shaft (GWA):

in a sixth variant (3.5) by engaging the third shift element (C) and the sixth shift element (F);

in a seventh variant (3.6) by engaging the fifth shift element (E) and the sixth shift element (F); and in an eighth variant (3.7) by engaging the fourth shift element (D) and the sixth shift element (F).

9. The transmission of claim 7, wherein an additional gear (Z1) results between the first input shaft (GW1) and the output shaft (GWA) by engaging the second shift element (B) and the sixth shift element (F).

10. The transmission of claim 7, wherein a forward electrodynamic starting mode (EDA-V) results by engaging the sixth shift element (F).

11. The transmission of claim 1, further comprising a seventh shift element (K) arranged and configured such that, in an actuated condition, the seventh shift element (K) connects two elements of the first planetary gear set (P1) or two elements of second planetary gear set (P2) to each other in a rotationally fixed manner.

12. The transmission of claim 11, wherein a third gear (E3) results between the second input shaft (GW2) and the output shaft (GWA) by engaging the seventh shift element (K).

13. The transmission of claim 1, further comprising an eighth shift element (H) arranged and configured such that, in an actuated condition, the eighth shift element (H) connects the second input shaft (GW2) to the rotationally fixed component (GG) in a rotationally fixed manner.

14. The transmission of claim 13, wherein a mechanical reverse gear is implementable between the first input shaft (GW1) and the output shaft (GWA) by engaging the fourth shift element (D) and the eighth shift element (H).

15. The transmission of claim 1, further comprising a ninth shift element in the form of a double shift element (I/J) arranged and configured for:

when the double shift element (I/J) is in a first shift position, connecting the rotor (R) of the first electric machine (EM1) to the first element (E11) of the first planetary gear set (P1);

when the double shift element (I/J) is in a second shift position, connecting the rotor (R) of the first electric machine (EM1) to the second element (E21) of the first planetary gear set (P1); and transferring the rotor (R) of the first electric machine (EM1) into a third, neutral position.

16. The transmission of claim 1, wherein:

two of the first, second, third, fourth, and fifth shift elements (A, B, C, D, E) are combined to form a shift element pair;

an actuating element is associated with the shift element pair; and the shift element pair is configured such that either a first one of the first, second, third, fourth, and fifth shift elements (A, B, C, D, E) or a second one of the first, second, third, fourth, and fifth shift elements (A, B, C, D, E) is engageable by the actuating element from a neutral position of the actuating element.

17. The transmission of claim 1, wherein four of the first, second, third, fourth, and fifth shift elements (A, B, C, D, E) are combined to form two shift element pairs;

a respective actuating element is associated with each shift element pair; and each shift element pair is configured such that a respective first one of the first, second, third, fourth, and fifth shift elements (A, B, C, D, E) or a respective second one of the first, second, third, fourth, and fifth shift elements (A, B, C, D, E) is engageable by the respective actuating element from a neutral position of the respective actuating element.

18. The transmission of claim 1, wherein six of the first, second, third, fourth, and fifth shift elements (A, B, C, D, E) are combined to form three shift element pairs;

a respective actuating element is associated with each shift element pair; and each shift element pair is configured such that a respective first one of the first, second, third, fourth, and fifth shift elements (A, B, C, D, E) or a respective second one of the first, second, third, fourth, and fifth shift elements (A, B, C, D, E) is engageable by the respective actuating element from a neutral position of the respective actuating element.

19. The transmission of claim 1, further comprising an additional electric machine, a rotor (R2) of the additional electric machine connected to the first input shaft (GW1).

20. The transmission of claim 1, further comprising a tenth shift element (K0), the first input shaft (GW1) rotationally fixable to a connection shaft (AN) with the tenth shift element (K0).

21. The transmission of claim 1, wherein one or more of the first, second, third, fourth, fifth, and sixth shift elements (A, B, C, D, E, F) is a form-locking shift element.

22. A motor vehicle drive train for a hybrid or electric vehicle, comprising the transmission (G) of claim 1.

23. A method for operating the transmission (G) of claim 1, wherein only the fifth shift element (E) is engaged in order to implement a charging operation or a starting operation.

* * * * *